(12) United States Patent
Goto et al.

(10) Patent No.: US 9,276,647 B2
(45) Date of Patent: Mar. 1, 2016

(54) BASE STATION DEVICE AND MOBILE STATION DEVICE USED IN COOPERATIVE COMMUNICATIONS

(75) Inventors: Jungo Goto, Osaka (JP); Hiroki Takahashi, Osaka (JP); Osamu Nakamura, Osaka (JP); Kazunari Yokomakura, Osaka (JP); Yasuhiro Hamaguchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 73 days.

(21) Appl. No.: 14/343,516

(22) PCT Filed: Jul. 26, 2012

(86) PCT No.: PCT/JP2012/068963
§ 371 (c)(1),
(2), (4) Date: Mar. 7, 2014

(87) PCT Pub. No.: WO2013/035456
PCT Pub. Date: Mar. 14, 2013

(65) Prior Publication Data
US 2015/0043451 A1    Feb. 12, 2015

(30) Foreign Application Priority Data

Sep. 8, 2011    (JP) .................................. 2011-195949

(51) Int. Cl.
*H04W 88/08*    (2009.01)
*H04B 7/02*    (2006.01)
*H04W 72/04*    (2009.01)
*H04W 52/46*    (2009.01)
*H04W 92/20*    (2009.01)

(52) U.S. Cl.
CPC .............. *H04B 7/024* (2013.01); *H04W 52/46* (2013.01); *H04W 72/0453* (2013.01); *H04W 88/08* (2013.01); *H04W 72/0426* (2013.01); *H04W 92/20* (2013.01)

(58) Field of Classification Search
None
See application file for complete search history.

(56) References Cited

U.S. PATENT DOCUMENTS

2011/0053589 A1 *  3/2011  Kimura et al. ................ 455/424
2011/0170623 A1    7/2011  Park et al.
(Continued)

FOREIGN PATENT DOCUMENTS

| WO | WO 2009024018 A1 * | 2/2009 | ............... H04L 1/00 |
| WO | 2011/087258 A2 | 7/2011 | |
| WO | 2011/105275 A1 | 9/2011 | |

OTHER PUBLICATIONS

NTT Docomo, "Views for Rel. 11 CoMP", 3GPP TSG RAN WG1 Meeting #63bis, R1-110248, Jan. 17-21, 2011, pp. 1-3.

(Continued)

*Primary Examiner* — Omar Ghowrwal
(74) *Attorney, Agent, or Firm* — Keating & Bennett, LLP

(57) ABSTRACT

The present invention reduces the amount of frequency resources required for uplink cooperative communication. There is provided a base station device that is applied to a communication system in which a plurality of base station devices establish cooperative communication with at least one mobile station device and includes a base station-to-base station communication section 220 and a control information determination section 216. The base station-to-base station communication section 220 communicates with another base station device when establishing cooperative communication. The control information determination section 216 allocates a band for communication use by the mobile station device in such a manner that a signal received cooperatively by another base station device and a signal received uncooperatively by another base station device overlap with each other at certain frequencies.

10 Claims, 21 Drawing Sheets

(56) References Cited

U.S. PATENT DOCUMENTS

2012/0020319 A1* 1/2012 Song et al. .................. 370/330
2012/0327830 A1  12/2012 Hamaguchi et al.

OTHER PUBLICATIONS

Official Communication issued in International Patent Application No. PCT/JP2012/068963, mailed on Oct. 30, 2012.

* cited by examiner

BASE STATION DEVICE AND MOBILE STATION DEVICE USED IN COOPERATIVE COMMUNICATIONS

TECHNICAL FIELD

The present invention relates to a technology that allows a base station device to provide cooperative communication with another base station device when the base station device receives signals transmitted from a plurality of mobile station devices.

BACKGROUND ART

The LTE-Advanced system (also referred to as the LTE-A or IMT-A system), which is an advanced version of the long term evolution (LTE) system, is being standardized as a wireless communication system for fourth-generation cell phones.

For the LTE-A system, a cooperative communication technology for downlinks and uplinks is being studied to provide improved coverage (refer to NPL 1). The cooperative communication technology permits a plurality of base stations to cooperatively transmit or receive data during data transmission/reception between a base station and a mobile station. For cooperative communication through an uplink, in particular, transmission performance can be improved when signals transmitted from a mobile station are received by a plurality of base stations and then combined. The signals received by the base stations are shared through a wired communication system based, for instance, on optical fiber.

FIG. 21 is a schematic diagram illustrating a system to which an uplink cooperative communication (coordinated multi-point reception or CoMP) scheme is applied. In the system depicted in FIG. 21, base stations eNB3, eNB4 exist and are capable of sharing, for example, received data through optical fiber. Further, mobile stations UE5-UE7 exist and communicate with either of the two base stations. A synchronization signal or the like is used to connect the mobile stations UE5-UE7 to a base station that exhibits the highest reception power or signal-to-interference-plus-noise ratio (SINR).

In the communication system depicted in FIG. 21, the mobile stations UE5, UE6 are respectively connected to the base stations eNB3, eNB4. Meanwhile, the mobile station UE7 is connected to both the base stations eNB3, eNB4 as the base stations eNB3, eNB4 are engaged in cooperative communication. However, the mobile station UE7 does not always need to grasp all the base stations engaged in cooperative communication. The mobile station UE7 may receive parameters used for data transmission, as control information, from a particular base station only.

A frequency band used for data transmission by the mobile stations connected to the base stations engaged in cooperative communication is generally determined depending on frequency band use of all base stations engaged in cooperative communication. In other words, the frequency bands to be allocated to the mobile stations connected to each base station are determined so that they are orthogonal to each other on the frequency axis. Hence, in the example depicted in FIG. 21, the base station eNB3 determines a band allocation so that the frequency bands used for data transmission by the mobile stations UE5, UE7 are orthogonal to each other. Meanwhile, the base station eNB4 determines the band allocation so that the frequency bands used for data transmission by the mobile stations UE6, UE7 are orthogonal to each other.

CITATION LIST

Non Patent Literature

NPL 1: NTT DOCOMO, R1-110248, "Views for Rel. 11 CoMP"

SUMMARY OF INVENTION

Technical Problem

In a wireless communication system that provides cooperative communication between base stations, the band allocation for mobile stations connected to each base station is determined as described above so that the allocated bands are orthogonal to each other on the frequency axis. However, there is a problem for uplink cooperative communication in that the amount of frequency resources may become inadequate because it increases with an increase in the number of cooperating base stations.

The present invention has been made in view of the above circumstances. An object of the present invention is to provide a base station device, a program, an integrated circuit, a mobile station device, and a communication system that reduce the amount of frequency resources required for uplink cooperative communication.

Solution to Problem (1) In order to achieve the above object, the present invention implements the following means. More specifically, a base station device according to the present invention is applied to a communication system in which a plurality of base station devices establish cooperative communication with at least one mobile station device. The base station device includes a base station-to-base station communication section and a control information determination section. The base station-to-base station communication section communicates with another base station device when establishing cooperative communication. The control information determination section allocates a band for communication use by the mobile station device in such a manner that a signal received cooperatively by another base station device and a signal received uncooperatively by another base station device overlap with each other at certain frequencies.

As described above, the band for communication use by the mobile station device is allocated in such a manner that a signal received cooperatively by another base station device and a signal received uncooperatively by another base station device overlap with each other at certain frequencies. Therefore, when cooperative communication is to be established, all base station devices do not need to maintain orthogonality. Consequently, a communication system providing cooperative communication can efficiently use frequencies. This makes it possible to increase the efficiency of frequency use.

(2) Further, the base station device according to the present invention receives signals with a smaller number of antennas than the number of signals allocated overlappingly to the certain frequencies.

As described above, the signals are received with a smaller number of antennas than the number of signals allocated overlappingly to certain frequencies. This makes it possible to increase the efficiency of frequency use.

(3) Further, the base station device according to the present invention shares a signal of the mobile station device, which is received cooperatively by the other base station device, with the other base station device and performs a cancellation process.

As described above, the signal of the mobile station device, which is received cooperatively by another base station device, is shared with another base station device and subjected to the cancellation process. Therefore, an inter-user interference, which may be caused by an overlap, can be eliminated. This makes it possible to reduce the influence on transmission performance and provide an increased throughput.

(4) Further, the base station device according to the present invention shares a signal allocated overlappingly to the certain frequencies with another base station device and performs the cancellation process.

As described above, a signal allocated overlappingly to certain frequencies is shared with another base station device and subjected to the cancellation process. Therefore, an inter-user interference, which may be caused by an overlap, can be eliminated. This makes it possible to reduce the influence on transmission performance and provide an increased throughput.

(5) Further, when a band for communication use by the mobile station device is to be allocated in such a manner that a signal received cooperatively and a signal received uncooperatively overlap with each other at certain frequencies in another base station device, the control information determination section of the base station device according to the present invention allocates the band for communication use by the mobile station device so that the signal received cooperatively and the signal received uncooperatively are orthogonal to each other in a frequency domain.

As described above, when a band for communication use by a mobile station device is to be allocated in such a manner that a signal received cooperatively and a signal received uncooperatively overlap with each other at certain frequencies in another base station device, the band for communication use by the mobile station device is allocated so that the signal received cooperatively and the signal received uncooperatively are orthogonal to each other in a frequency domain. Therefore, an inter-user interference can be eliminated. This makes it possible to reduce the influence on transmission performance and provide an increased throughput.

(6) Further, when a band for communication use by the mobile station device is to be allocated in such a manner that a signal received cooperatively and a signal received uncooperatively overlap with each other at certain frequencies in another base station device, the control information determination section of the base station device according to the present invention allocates the band for communication use by the mobile station device so that the signal received cooperatively and the signal received uncooperatively overlap with each other at the certain frequencies.

As described above, when a band for communication use by a mobile station device is to be allocated in such a manner that a signal received cooperatively and a signal received uncooperatively overlap with each other at certain frequencies in another base station device, the band for communication use by the mobile station device is allocated so that the signal received cooperatively and the signal received uncooperatively overlap with each other at the certain frequencies. Therefore, an inter-user interference can be eliminated. This makes it possible to reduce the influence on transmission performance and provide an increased throughput.

(7) Further, the base station device according to the present invention calculates a transmission power parameter that achieves predetermined reception quality in the mobile station device. Moreover, the base station device according to the present invention shares the calculated parameter with another base station device and notifies the mobile station device of the maximum value of the parameter calculated by each base station device.

As described above, the mobile station device is notified of the maximum value of the parameter calculated by each base station device. Therefore, when a band allocated to a mobile station device involved in cooperative communication and a band allocated to a mobile station device uninvolved in cooperative communication overlap with each other in a frequency domain, predetermined reception quality can be achieved in each base station device. This makes it possible to provide an increased throughput.

(8) Further, the base station device according to the present invention calculates a transmission power parameter that achieves predetermined reception quality in the mobile station device. Moreover, the base station device according to the present invention shares the calculated parameter with another base station device and notifies the mobile station device of the average value of the parameter calculated by each base station device.

As described above, the mobile station device is notified of the average value of the parameter calculated by each base station device. Therefore, when a band allocated to a mobile station device involved in cooperative communication and a band allocated to a mobile station device uninvolved in cooperative communication overlap with each other in a frequency domain, predetermined reception quality can be achieved in each base station device. This makes it possible to provide an increased throughput.

(9) Further, the base station device according to the present invention not only calculates, in accordance with a channel estimation signal received from a mobile station device having a plurality of antennas, the frequency response of each of the plurality of antennas, but also shares the calculated frequency response with another base station device and determines a precoding scheme in accordance with the calculated frequency response so as to maximize a signal-to-interference-plus-noise ratio (SINR).

As described above, the precoding scheme is determined in accordance with the calculated frequency response so as to maximize the SINR. Therefore, when a band allocated to a mobile station device involved in cooperative communication and a band allocated to a mobile station device uninvolved in cooperative communication overlap with each other in a frequency domain, predetermined reception quality can be achieved in each base station device. This makes it possible to provide an increased throughput.

(10) Further, the base station device according to the present invention not only calculates, in accordance with a channel estimation signal received from a mobile station device having a plurality of antennas, the frequency response of each of the plurality of antennas, but also shares the calculated frequency response with another base station device and determines the precoding scheme in accordance with the calculated frequency response so as to provide the maximum capacity.

As described above, the precoding scheme is determined in accordance with the calculated frequency response so as to provide the maximum capacity. Therefore, when a band allocated to a mobile station device involved in cooperative communication and a band allocated to a mobile station device uninvolved in cooperative communication overlap with each other in a frequency domain, predetermined reception quality can be achieved in each base station device. This makes it possible to provide an increased throughput.

(11) A program according to the present invention is a program for a base station device that is applied to a communication system in which a plurality of base station devices establish cooperative communication with at least one mobile station device. The program causes a computer to perform a series of processes, namely, a process of communicating with another base station device when establishing cooperative communication and a process of allocating a band for communication use by the mobile station device in such a manner that a signal received cooperatively by another base station device and a signal received uncooperatively by another base station device overlap with each other at certain frequencies.

As described above, the band for communication use by the mobile station device is allocated in such a manner that a signal received cooperatively by another base station device and a signal received uncooperatively by another base station device overlap with each other at certain frequencies. Therefore, when cooperative communication is to be established, all base station devices do not need to maintain orthogonality. Consequently, a communication system providing cooperative communication can efficiently use frequencies. This makes it possible to increase the efficiency of frequency use.

(12) An integrated circuit according to the present invention is an integrated circuit that causes a base station device to exercise a plurality of functions when mounted in the base station device. The integrated circuit causes the base station device to exercise a series of functions, namely, a function of communicating with another base station when establishing cooperative communication and a process of allocating a band for communication use by the mobile station device in such a manner that a signal received cooperatively by another base station device and a signal received uncooperatively by another base station device overlap with each other at certain frequencies.

As described above, the band for communication use by the mobile station device is allocated in such a manner that a signal received cooperatively by another base station device and a signal received uncooperatively by another base station device overlap with each other at certain frequencies. Therefore, when cooperative communication is to be established, all base station devices do not need to maintain orthogonality. Consequently, a communication system providing cooperative communication can efficiently use frequencies. This makes it possible to increase the efficiency of frequency use.

(13) A mobile station device according to the present invention establishes cooperative communication with a plurality of base station devices by using a frequency band allocated by the base station device described in any one of (1) to (10) above.

If the above configuration is adopted, all base station devices do not need to maintain orthogonality when cooperative communication is to be established. Consequently, a communication system providing cooperative communication can efficiently use frequencies. This makes it possible to increase the efficiency of frequency use.

(14) A communication system according to the present invention includes the base station device described in any one of (1) to (10) above and the mobile station device described in (13).

If the above configuration is adopted, all base station devices do not need to maintain orthogonality when cooperative communication is to be established. Consequently, a communication system providing cooperative communication can efficiently use frequencies. This makes it possible to increase the efficiency of frequency use.

Advantageous Effects of Invention

According to the present invention, it is possible to increase the efficiency of frequency use for uplink cooperative communication and provide an increased throughput in a wireless communication system that establishes cooperative communication with another base station when receiving signals transmitted from a plurality of mobile stations.

DESCRIPTION OF EMBODIMENTS

Embodiments of the present invention will now be described with reference to the accompanying drawings. The following embodiments are described in relation to an uplink transmission in which a mobile station is used as a data transmitting device while a base station is used as a data receiving device. A base station device may be simply referred to as a base station, whereas a mobile station device may be simply referred to as a mobile station.

[First Embodiment]

Figure 1:
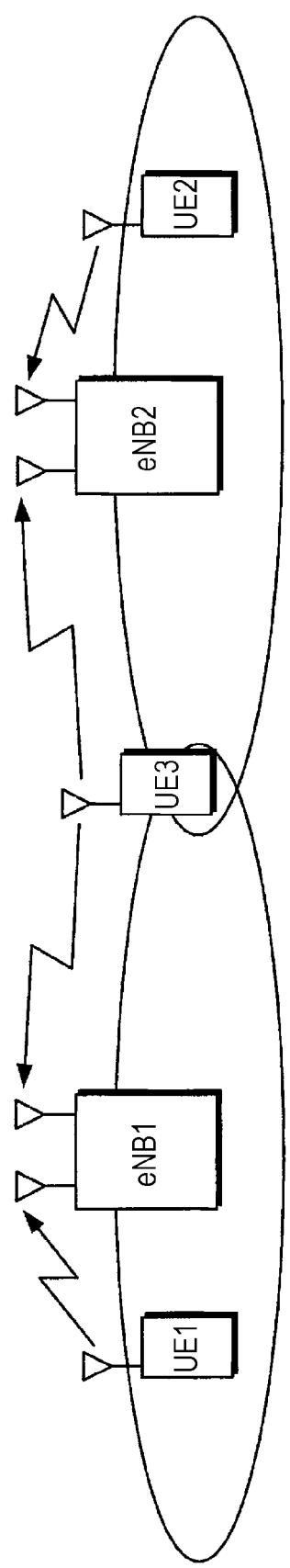
FIG. 1 is a schematic diagram illustrating a communication system according to a first embodiment of the present invention to which an uplink cooperative communication scheme is applied.

FIG. 1 is a schematic diagram illustrating a communication system according to a first embodiment of the present invention to which an uplink cooperative communication scheme is applied. In the communication system depicted in FIG. 1, base stations eNB1, eNB2 exist and are capable of sharing, for instance, received data through optical fiber. Further, mobile stations UE1-UE3 exist and communicate with either of the two base stations. A synchronization signal or the like is used to connect the mobile stations UE1-UE3 to a base station that exhibits the highest reception power or a high signal-to-interference-plus-noise ratio (SINR).

In the communication system depicted in FIG. 1, the mobile stations UE1, UE2 are respectively connected to the base stations eNB1, eNB2. Meanwhile, the mobile station UE3 is connected to both the base stations eNB1, eNB2 as the base stations eNB1, eNB2 are engaged in cooperative communication. However, the mobile station UE3 does not always need to grasp all the base stations engaged in cooperative communication. The mobile station UE3 may receive parameters used for data transmission, as control information, from a particular base station only.

Figure 2:
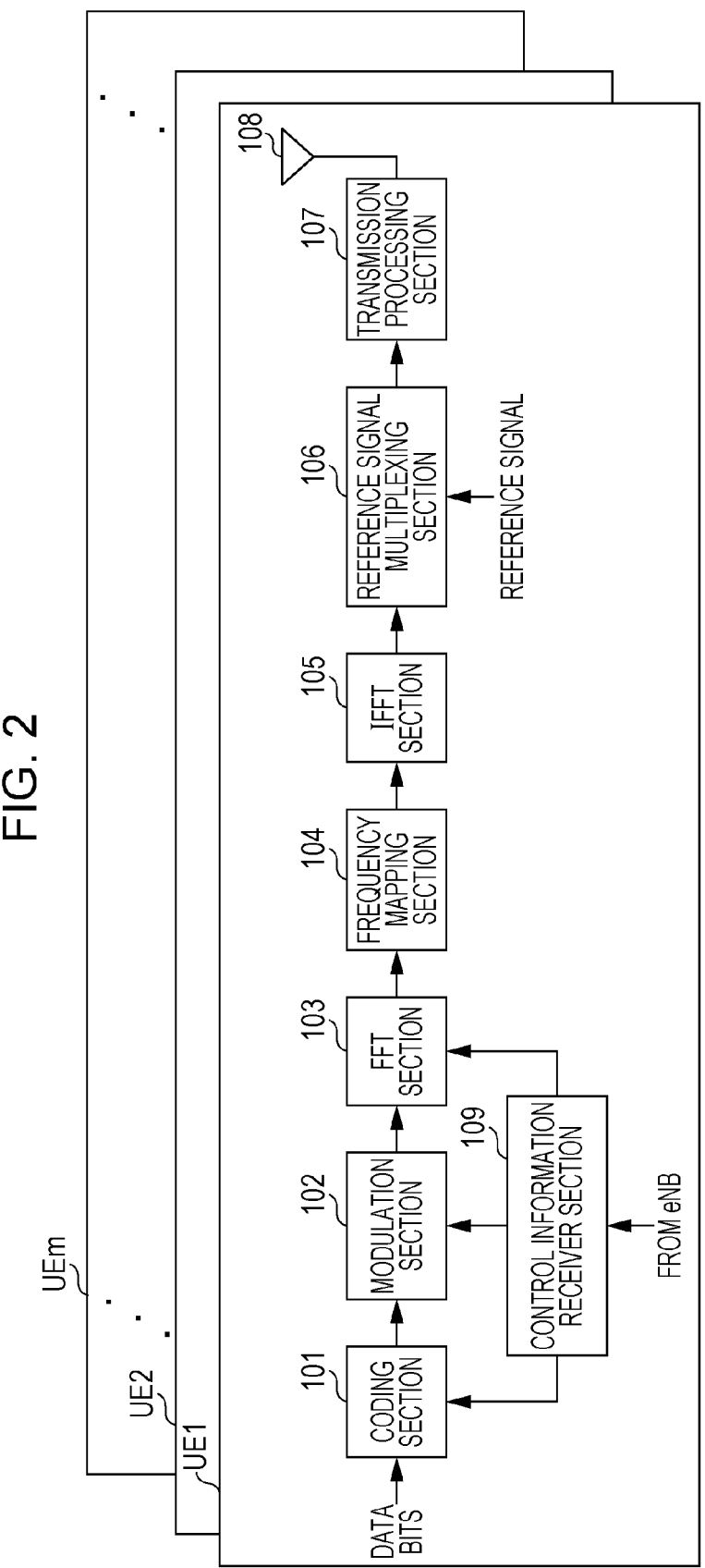
FIG. 2 is a block diagram illustrating an exemplary configuration of mobile stations according to the first embodiment of the present invention.

FIG. 2 is a block diagram illustrating an exemplary configuration of mobile stations UE1-UEm according to the first embodiment of the present invention. Components not necessary for explanation are omitted from FIG. 2. In the example depicted in FIG. 2, the number of mobile stations UE1-UEm is m. The mobile stations UE1-UEm transmit data to base stations, as is the case with the mobile stations UE1-UE3 depicted in FIG. 1.

Although FIG. 2 indicates that the number of mobile station antennas is one, a plurality of antennas may be used for transmission and reception to achieve transmit diversity or multiple-input multiple-output (MIMO). The number of antennas is not limited to the number of physical antennas, but may be construed as the number of antenna ports. An antenna port denotes a plurality of antennas that are considered to have the same physical configuration. As the mobile stations perform the same data transmission process, the mobile station UE1 will be described as an example.

In the mobile station UE1, a control information receiver section 109 receives control information for the mobile station UE1, which is transmitted from a base station. The control information includes, for example, frequency allocation information for data transmission and information about a modulation order, coding rate, and coding method. When cooperative communication is to be established, the control information may be received from only a particular base station or the same control information may be received from a plurality of base stations. The control information receiver section 109 inputs the information about the coding rate and coding method, which is included in the received control information, to a coding section 101, inputs the information about the modulation order to a modulation section 102, and inputs the frequency allocation information to a frequency mapping section 104.

The coding section 101 encodes input data bits to obtain an error correction code such as a turbo code or low-density parity-check (LDPC) code. An error correction coding method exercised by the coding section 101 may be predetermined for transmission and reception or designated in the form of the control information. Further, the coding section 101 performs a puncture in accordance with the information about the coding rate, which is transmitted in the form of the control information, and outputs the resulting encoded bits to the modulation section 102.

The modulation section 102 subjects the encoded bits to quaternary phase-shift keying (QPSK), 16-ary quadrature amplitude modulation (16-QAM), 64-QAM, or other modulation in accordance with the modulation order input from the control information receiver section 109. A modulation symbol output from the modulation section 102 is converted from a time-domain data signal to a frequency-domain data signal in an FFT section 103 and then output to the frequency mapping section 104.

Figure 3:
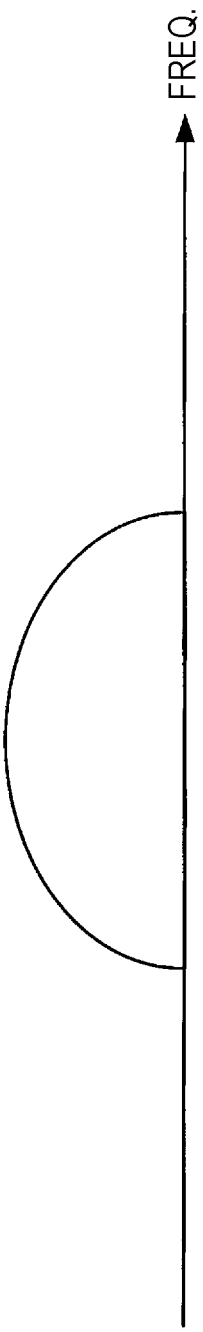
FIG. 3 is a diagram illustrating a signal allocation method.
Figure 4:
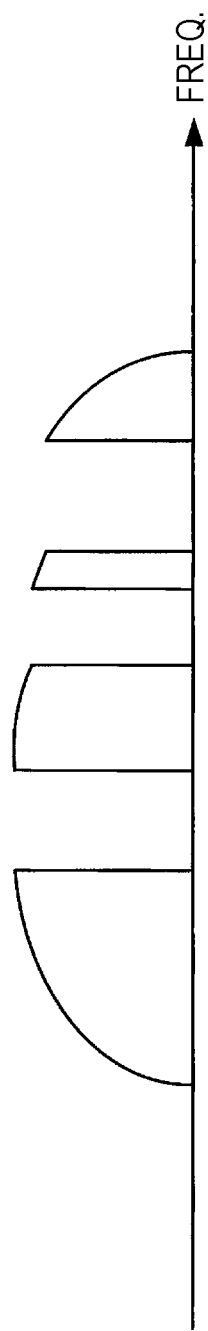
FIG. 4 is a diagram illustrating a signal allocation method.

The frequency mapping section 104 allocates the input frequency-domain data signal in accordance with the frequency allocation information transmitted from the control information receiver section 109. FIGS. 3 and 4 are diagrams illustrating a signal allocation method. When a discrete Fourier transform spread orthogonal frequency division multiplexing (DFT-S-OFDM or SC-FDMA) method for allocation to contiguous frequencies is employed, a single-carrier spectrum is allocated as depicted in FIG. 3.

When, on the other hand, a clustered DFT-S-OFDM method for allocation to discrete frequencies is employed, signal allocation is performed as indicated in the example of FIG. 4. An IFFT section 105 converts a signal output from the frequency mapping section 104 to a time-domain signal. A reference signal multiplexing section 106 performs a process of forming a transmission frame by multiplexing a reference signal, which is known in the transmitting and receiving devices, on a transmitted signal in the time domain. In the example of FIG. 2, the transmission frame is formed by multiplexing the reference signal in the time domain. Alternatively, however, the transmission frame may be formed by multiplexing the reference signal in a frequency domain.

A transmission processing section 107 inserts a cyclic prefix (CP) into a signal on which the reference signal is multiplexed, subjects the signal to digital-to-analog (D/A) conversion, and upconverts the resulting analog signal to a wireless frequency. A power amplifier (PA) amplifies the upconverted signal. The amplified signal is then transmitted from a transmit antenna 108. The same process is also performed at the mobile stations UE2-UEm to transmit data.

Figure 5:
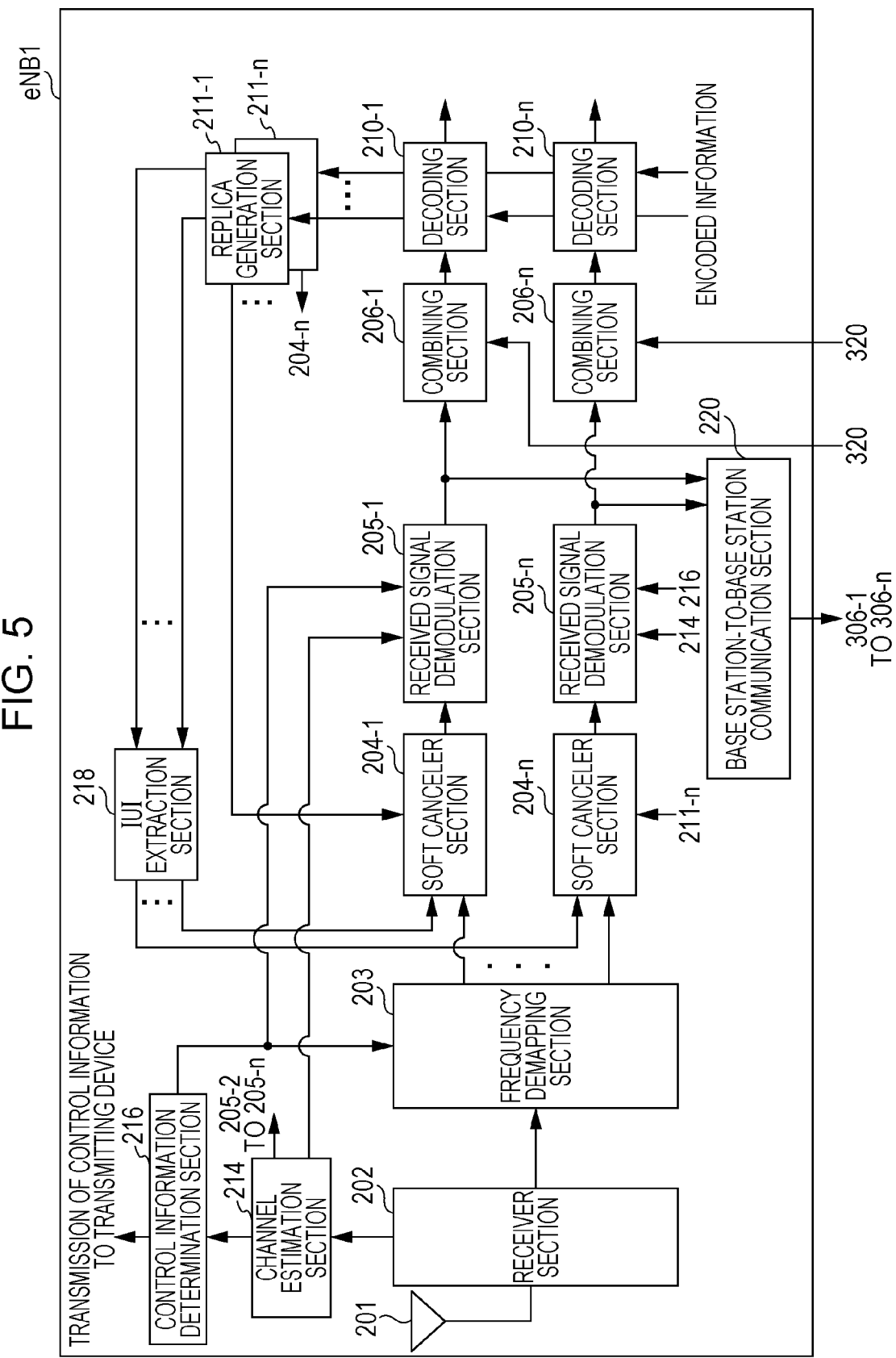
FIG. 5 is a block diagram illustrating an exemplary configuration of a base station according to the first embodiment of the present invention, which has one receive antenna.

The configuration of the base station eNB1 will now be described. FIG. 5 is a block diagram illustrating an exemplary configuration of the base station eNB1 according to the first embodiment of the present invention, which has one receive antenna. The base stations may include a plurality of receive antennas. The base station eNB1 receives a signal from a plurality of mobile stations with an antenna 201 and inputs the received signal to a receiver section 202. A case where a mobile station involved in cooperative communication and a mobile station uninvolved in cooperative communication coexist as the mobile stations connected to the base station eNB1 will now be described as an example.

Figure 6:
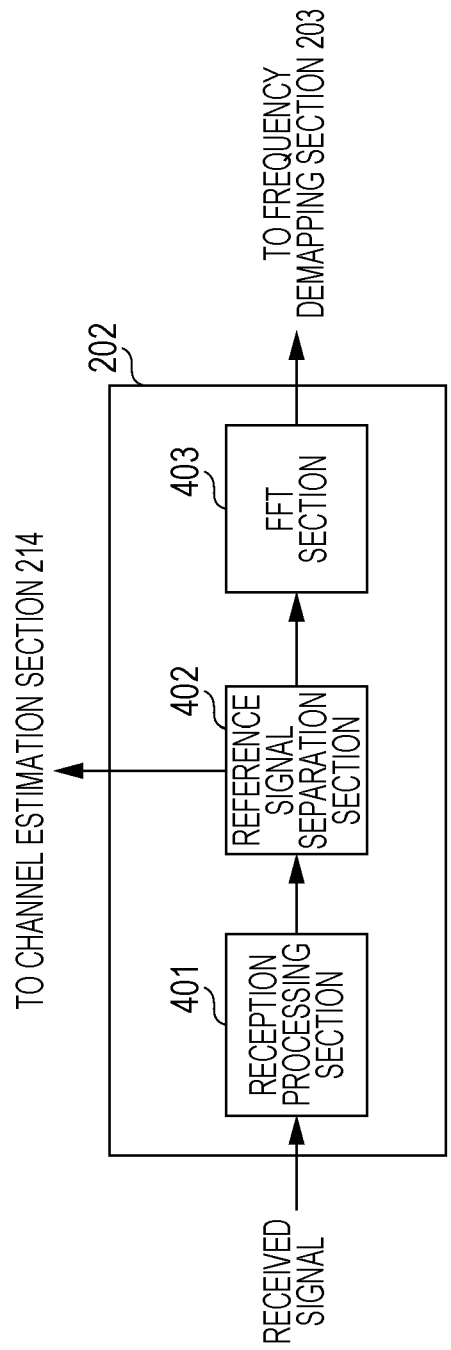
FIG. 6 is a block diagram illustrating an exemplary configuration of a receiver section according to the first embodiment of the present invention.

The signal input from the antenna 201 is input to the receiver section 202. FIG. 6 is a block diagram illustrating an exemplary configuration of the receiver section 202 according to the first embodiment of the present invention. A reception processing section 401 downconverts the input signal to a baseband frequency. The resulting downconverted signal is then converted to a digital signal through an analog-to-digital (A/D) conversion process. Next, the cyclic prefix is removed from the digital signal.

A reference signal separation section 402 receives a signal output from the reception processing section 401 and separates the received signal into the reference signal and the data signal. The reference signal separation section 402 outputs the reference signal to a channel estimation section 214 and the data signal to an FFT section 403. The FFT section 403 converts the data signal, which is output from the reference signal separation signal 402, from a time-domain signal to a frequency-domain signal, and outputs the resulting signal to a frequency demapping section 203.

Meanwhile, the channel estimation section 214 estimates a channel performance (frequency response) from the reference signal and outputs the estimated channel performance to received signal demodulation sections 205-1 to 205-n and control information determination section 216. The reference signal is known in the transmitting and receiving devices and input from the receiver section 202. The letter n represents the number of users (mobile stations) that have transmitted data to the base station. The control information determination section 216 determines, in accordance with the channel performance acquired from the channel estimation section 214, whether or not to establish cooperative communication with individual mobile stations. Further, when it is determined that a mobile station is involved in cooperative communication, the control information determination section 216 issues a notification to demand the performance of a channel between the mobile station and another base station providing cooperative communication. After the channel performance of the mobile station involved in cooperative communication is received from the other base station providing cooperative communication, the control information determination section 216 of each base station determines a band allocation for the mobile station and other control information required for data transmission, such as the coding rate and modulation method. Although the communication between the control information determination section 216 and the other base station is not depicted in FIG. 5, it is assumed that the communication is established through a base station-to-base station communication section 220. However, another method may be used for information sharing. The control information is then transmitted to the mobile station as the control information for the next transmission opportunity. Further, the control information determination section 216 also transmits the band allocation for the mobile station involved in cooperative communication to the other base station that provides cooperative communication. The control information determined as described above is retained until the next data reception because it is necessary for the base stations to perform the next received signal process. The control information determination section 216 outputs the determined band allocation information to the frequency demapping section 203.

In accordance with the frequency allocation information, the frequency demapping section 203 extracts the frequency-domain signal, which is allocated contiguously or discretely, for each user (mobile station). The control information transmitted from a base station to a plurality of mobile stations is used as the frequency allocation information.

The signals extracted for individual users are respectively input to soft canceler sections 204-1 to 204-n. The soft canceler sections 204-1 to 204-n cancel a frequency-domain replica, which is generated by each replica generation section from decoded bits derived from individual decoding sections. A cancellation process will be described later in detail. However, nothing is performed in a first soft canceler process because no information is derived from the decoding sections 210-1 to 210-n.

Figure 7:
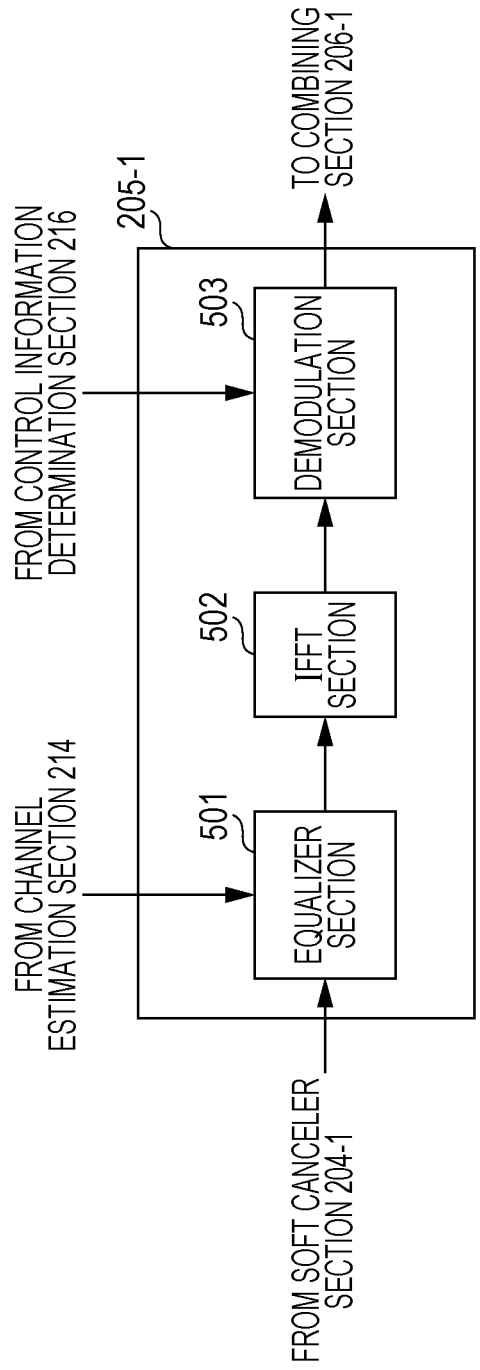
FIG. 7 is a block diagram illustrating an exemplary configuration of a received signal demodulation section according to the first embodiment of the present invention.

The received signal demodulation sections 205-1 to 205-n acquire a time-domain log-likelihood ratio (LLR) from a soft-canceled signal. FIG. 7 is a block diagram illustrating an exemplary configuration of the received signal demodulation section 205-1 according to the first embodiment of the present invention. The received signal demodulation section 205-1 will now be described, as an example, with reference to FIG. 7 because the received signal demodulation sections perform the same process.

The soft-canceled signal is input to an equalizer section 501 of the received signal demodulation section 205-1. The equalizer section 501 performs an equalization process on the soft-canceled signal in such a manner as to compensate for a wireless channel distortion, and outputs the resulting signal to an IFFT section 502. For example, the equalization process is performed so that the signal is multiplied, for instance, by a minimum mean square error (MMSE) weight or a zero forcing (ZF) weight. The equalization process is performed by using the channel performance input from the channel estimation section 214.

The IFFT section 502 converts the signal input from the equalizer section 501 from a frequency-domain signal to a time-domain signal. A demodulation section 503 stores a modulation order that is transmitted to a mobile station as the control information, and demodulates a symbol in accordance with the information about the modulation order. The demodulated bit is then output to a combining section 206-1.

For a user involved in cooperative communication, the combining sections 206-1 to 206-n combine the LLR derived from a signal received by the base station eNB1 with the LLR derived from a signal received by the other base station eNB2. In the present embodiment, the LLR input from the other base station eNB2 is shared through optical fiber or the like. For a mobile station that is not involved in cooperative communication, the LLR is 0. The above process will be described later in detail.

The outputs generated from the combining sections 206-1 to 206-n are respectively input to the decoding sections 210-1 to 210-n. The decoding sections 210-1 to 210-n perform error correction decoding in accordance with the information about the coding rate, which is transmitted to each mobile station as the control information. After completion of error correction decoding, the decoding sections 210-1 to 210-n output data bits. When a turbo equalization process is to be performed, the result of decoding is output to replica generation sections 211-1 to 211-n.

The replica generation sections 211-1 to 211-n generate symbol replicas by using the decoded bits and converts the symbol replicas to frequency signals for the purpose of generating frequency-domain replicas. The outputs of the replica generation sections 211-1 to 211-$n$ are respectively input to the soft canceler sections 204-1 to 204-$n$. The generated frequency-domain replicas are output to an IUI extraction section 218.

The above-described process is repeated to perform a process of receiving the data transmitted from a mobile station. This process is repeated until no more errors are detected by a cyclic redundancy check (CRC) or until a predetermined upper-limit repetition count is reached.

Figure 8:
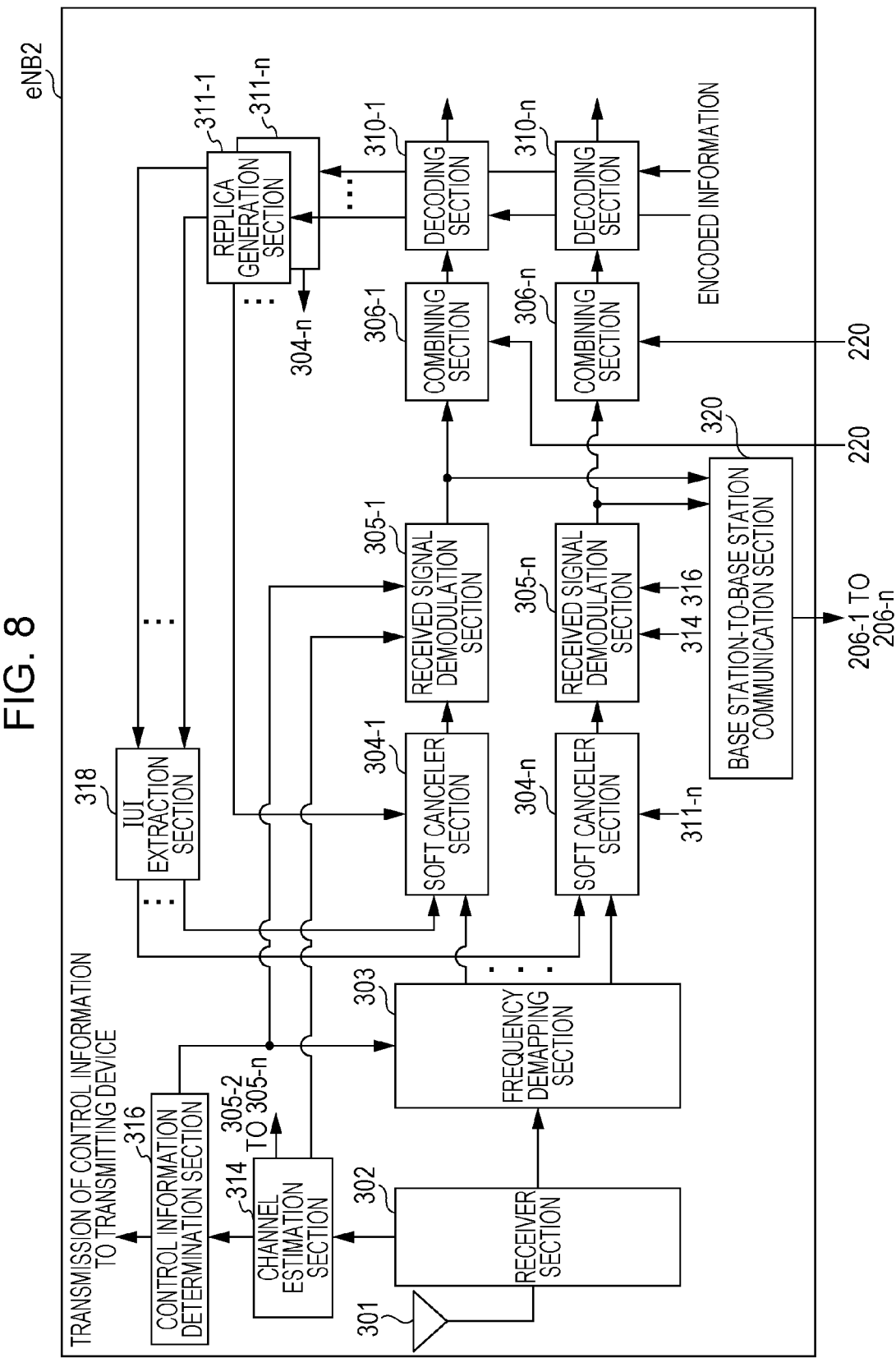
FIG. 8 is a block diagram illustrating an exemplary configuration of another base station according to the first embodiment of the present invention.

FIG. 8 is a block diagram illustrating an exemplary configuration of the other base station eNB2 according to the first embodiment of the present invention. The configuration of the base station eNB2 will not be redundantly described because it is the same as that of the base station eNB1 as depicted in FIG. 8. Individual sections 301-320 of the base station eNB2 respectively correspond to the individual sections 201-220 of the base station eNB1.

Figure 9:
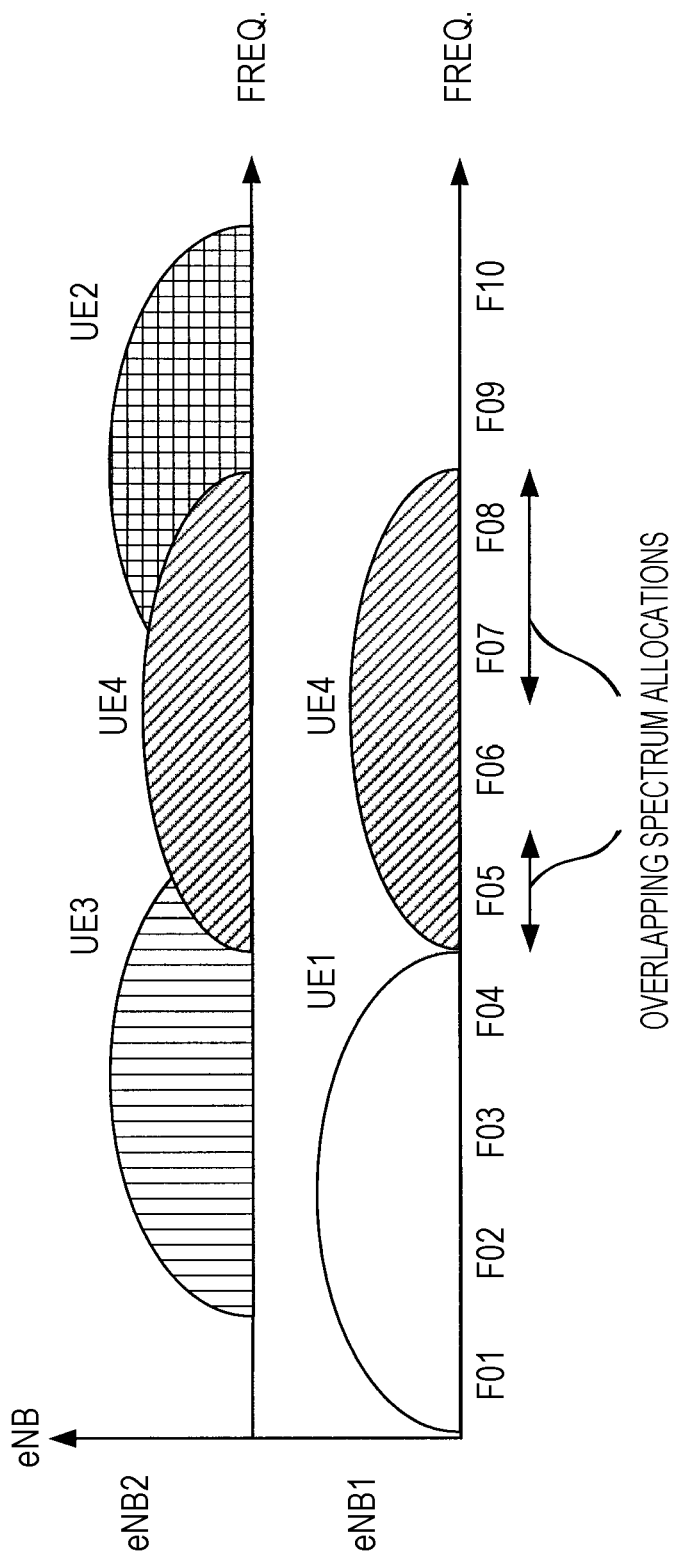
FIG. 9 is a diagram illustrating an example of band allocation in a frequency domain that is performed when cooperative communication is to be established in the first embodiment of the present invention.

FIG. 9 is a diagram illustrating an example of band allocation in a frequency domain that is performed when cooperative communication is to be established in the first embodiment of the present invention. In the example of FIG. 9, cooperative communication is not provided for the mobile stations UE1-UE3, and the mobile stations UE1-UE3 are connected to the base station eNB1 or to the base station eNB2. Meanwhile, the base stations eNB1 and eNB2 provide cooperative communication for the mobile station UE4.

In order to ensure, in the above instance, that the band allocation for the mobile station UE4 involved in cooperative communication is perfectly orthogonal to the band allocation for the other mobile stations, it is necessary to limit the bandwidth to be allocated in such a manner that none of the mobile stations connected to the same base station uses the same band. Hence, the number of transmittable data bits decreases. Therefore, the mobile station UE4 involved in cooperative communication permits an allocation that disrupts the orthogonality in the frequency domain. As a result, the allocation for the mobile station UE4 involved in cooperative communication overlaps with the allocations for the mobile stations UE2, UE3 as depicted in FIG. 9. This causes inter-user interference.

A reception process performed by the base stations eNB1, eNB2 when a band allocation is performed as depicted in FIG. 9 will now be described. In the base station eNB1 depicted in FIG. 5, the outputs of the IUI extraction section 218 are all 0 because there is no allocation that causes inter-user interference. Meanwhile, the replica generation sections 211-1 to 211-$n$ generate replicas in order to cancel an inter-symbol interference component from the decoding result. The replica generation sections 211-1 to 211-$n$ then input the generated replicas to the soft canceler sections 204-1 to 204-$n$.

The received signal demodulation sections 205-1 to 205-$n$ generate LLRs for all users from soft-canceled signals and input only the LLR of the mobile station UE4 involved in cooperative communication to the base station-to-base station communication section 220. It is assumed that the LLRs of the mobile stations UE1-UE3 uninvolved in cooperative communication are all 0. However, the LLRs of mobile stations that communicate uncooperatively for the purpose of eliminating, for instance, an inter-cell interference may be input to the base station-to-base station communication section 220. The reception process subsequently performed by the base station eNB1 is as described earlier.

Meanwhile, in the base station eNB2 depicted in FIG. 8, the LLR of the mobile station UE4 involved in cooperative communication is input from the base station-to-base station communication section 220. This LLR is then input to a combining section that is one of combining sections 306-1 to 306-$n$ and related to the reception process of the mobile station UE4. After combining the LLR of the mobile station UE4, the base station eNB2 generates frequency-domain soft replicas for the mobile stations UE2, UE3, UE4 through decoding sections 310-1 to 310-$n$ and replica generation sections 311-1 to 311-$n$.

The generated soft replicas are input to respective soft canceler sections 304-1 to 304-$n$ (the soft canceler sections 304-1 to 304-$n$ may be generically referred to as the soft canceler section 304) and to an IUI extraction section 318. The IUI extraction section 318 extracts only the soft replicas of overlapping spectra in order to eliminate an inter-user interference caused by the overlapping spectra. For example, a soft replica of an inter-user interference input to the soft canceler section 304 for the reception process of the mobile station UE3 depicted in FIG. 9 is generated by extracting an IUI component from the overlapping soft replicas of the mobile station UE4.

In the above-described embodiment, the LLR shared through base station-to-base station communication is used for combination. Alternatively, however, the LLR may be used for soft cancellation. For example, the LLR may be used so that a soft canceler eliminates an inter-user interference between the mobile stations UE2, UE3 depicted in FIG. 9, which is caused by the mobile station UE4.

Figure 10:
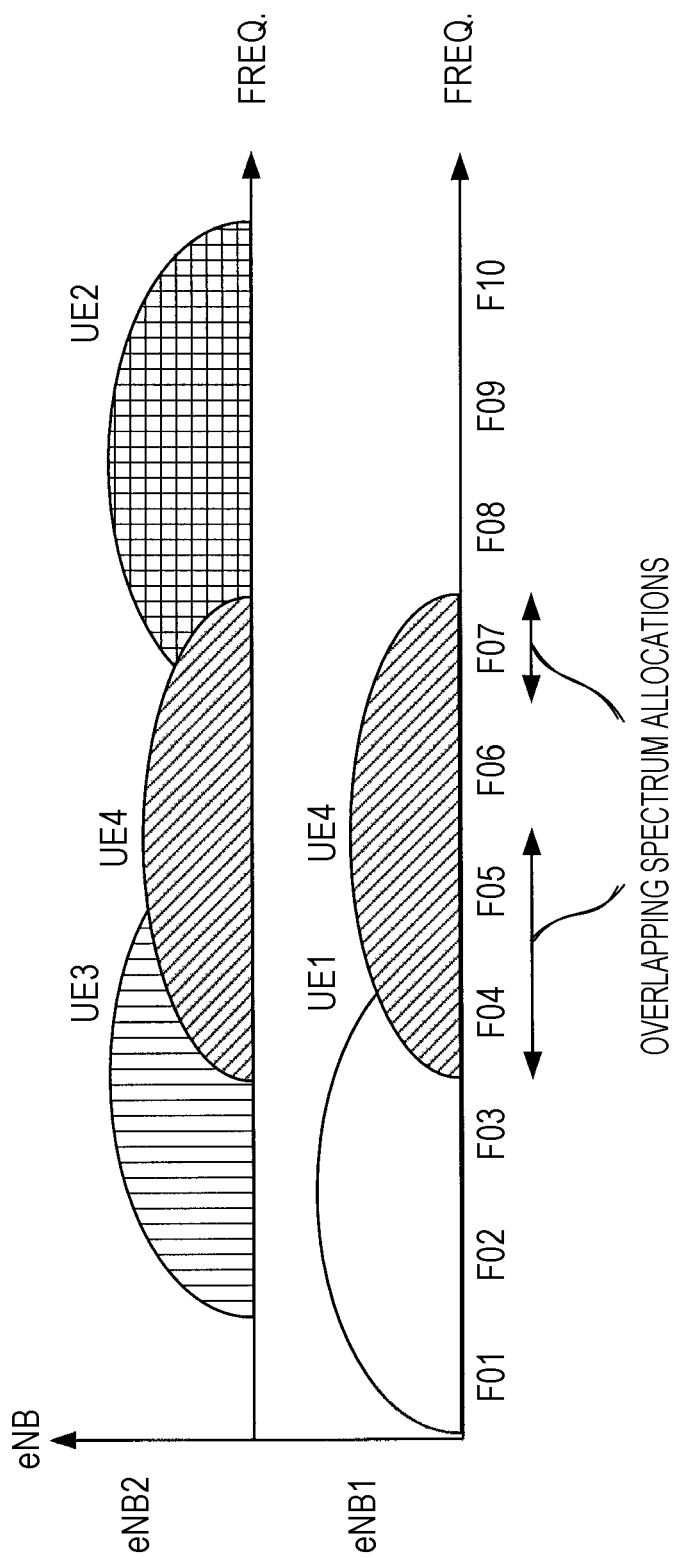
FIG. 10 is a diagram illustrating an example of band allocation in a frequency domain that is performed when cooperative communication is to be established in the first embodiment of the present invention.

FIG. 10 is a diagram illustrating an example of band allocation in a frequency domain that is performed when cooperative communication is to be established in the first embodiment of the present invention. In the example of FIG. 9, a band allocation is performed in such a manner as to disrupt the orthogonality in the base station eNB2. However, as depicted in FIG. 10, the band allocation may be performed in such a manner as to disrupt the orthogonality in the base station eNB1 as well. Further, although a contiguous band allocation is performed for each mobile station for the sake of brevity, a discrete band allocation may alternatively be performed. Furthermore, although cooperative communication is established between base stations in the above example, intra-site cooperative communication may be established between sectors.

Figure 11:
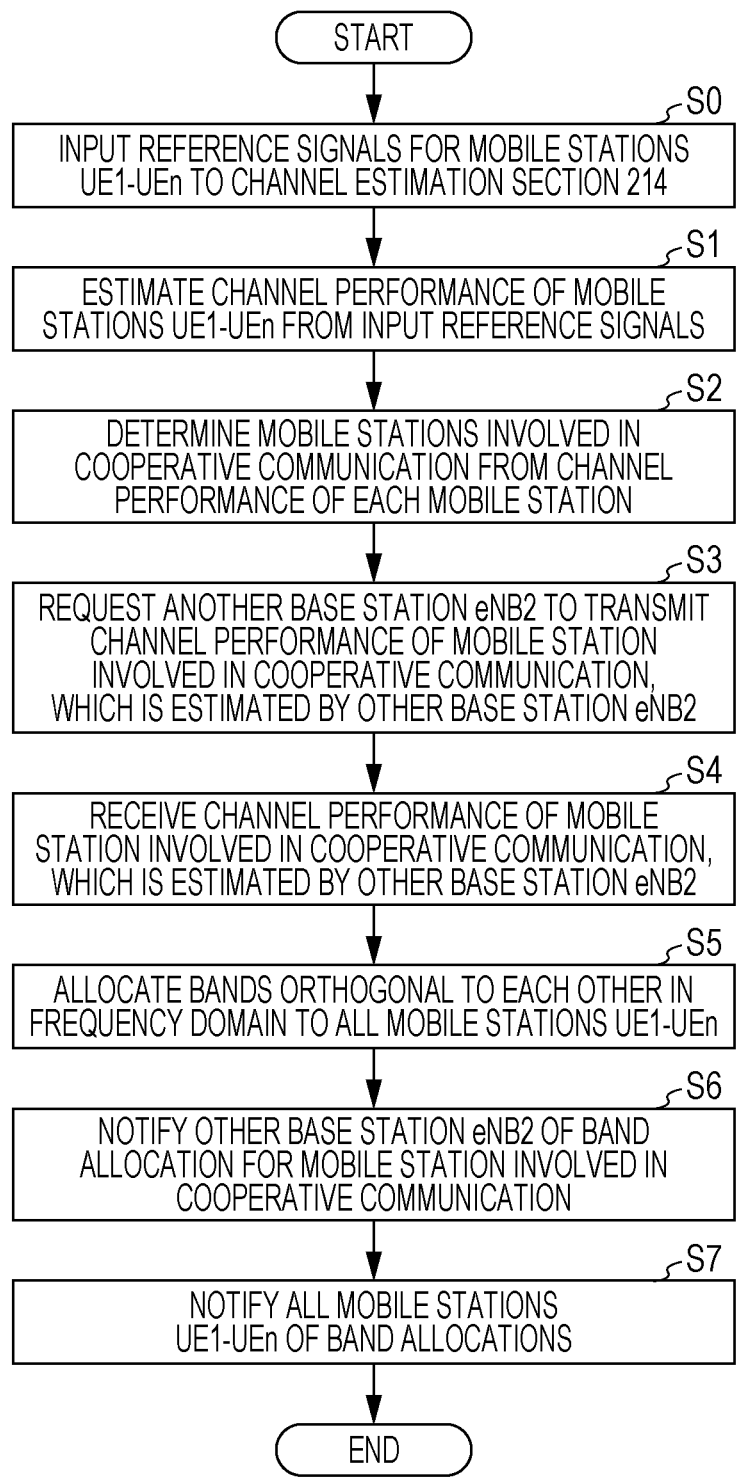
FIG. 11 is a flowchart illustrating operations that are performed in a base station according to the first embodiment of the present invention in order to determine a band allocation for mobile stations.

An example in which the base station eNB1 according to the present embodiment determines the band allocation for the mobile stations UE1-UEm will now be described. First of all, a case where bands allocated to all mobile stations UE1-UEm communicating with the base station eNB1 are orthogonal to each other in a frequency domain as depicted in FIG. 9 will be described with reference to FIG. 11. FIG. 11 is a flowchart illustrating operations that are performed in the base station eNB1 according to the first embodiment of the present invention in order to determine the band allocation for the mobile stations UE1-UEm.

At first, in the base station eNB1, the reference signals for the mobile stations UE1-UEm are input to the channel estimation section 214 (step S0). The channel estimation section 214 estimates the channel performance of each mobile station from the input reference signals (step S1). In accordance with the estimated channel performance of each mobile station, the control information determination section 216 determines whether cooperative communication is to be provided for each mobile station (step S2). This determination may be made, for example, by calculating an average SNR by using all or some of the estimated channel performances and comparing the calculated average SNR against a predetermined threshold value. In such an instance, the cooperative communication may be determined to be provided only for mobile stations whose average SNR is lower than the threshold value.

Next, the base station eNB1 not only transmits information to another base station eNB2 in order to describe a mobile station involved in cooperative communication, but also issues a notification to demand the channel performance of the mobile station involved in cooperative communication, which is estimated by the other base station eNB2 (step S3). The base station eNB1 then receives the channel performance of the mobile station involved in cooperative communication, which is estimated by the other base station eNB2 (step S4), and determines the band allocations for all the mobile stations UE1-UEm in such a manner that they are orthogonal to each other in the frequency domain (step S5).

For a mobile station uninvolved in cooperative communication, the band allocation is determined in accordance with the channel performance estimated in step S1. For a mobile station involved in cooperative communication, the band allocation is determined from both the channel performance estimated in step S1 and the channel performance received in step S4 so that the capacity is maximized. Further, when a band allocation is performed in step S5 in such a manner that the band allocation for a mobile station involved in cooperative communication and the band allocation for a mobile station uninvolved in cooperative communication are nonorthogonal to each other in the frequency domain, the band allocation depicted in FIG. 10 can be achieved.

After the above band allocation determination process, the band allocation for a mobile station involved in cooperative communication is transmitted so that it can be received by the other base station eNB2 as well (step S6). Further, the band allocation for a mobile station for which cooperative communication is to be also provided by the other base station eNB2 is determined without considering the band allocation for a mobile station uninvolved in cooperative communication. As a result, the band allocation for the mobile station involved in cooperative communication is nonorthogonal to the band allocation for the mobile station uninvolved in cooperative communication. However, the band allocations for mobile stations uninvolved in cooperative communication are determined so that they are orthogonal to each other in the frequency domain. Next, all the mobile stations UE1-UEm are notified of the band allocations determined in step S5 (step S7). Upon completion of step S7, a series of operations comes to an end.

Figure 12:
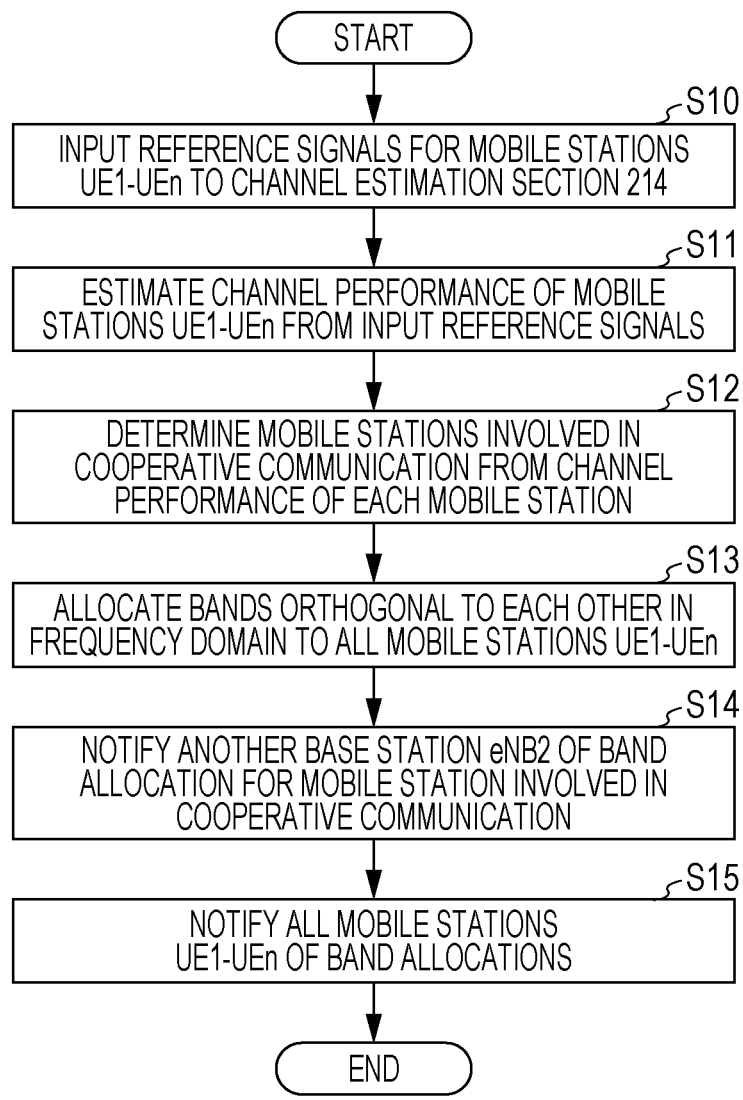
FIG. 12 is a flowchart illustrating a modified example of the operation depicted in FIG. 11 that is performed in a base station according to the first embodiment of the present invention in order to determine the band allocation.

FIG. 12 is a flowchart illustrating a modified example of the operations depicted in FIG. 11 that are performed in the base station eNB1 according to the first embodiment of the present invention in order to determine the band allocation. The example of FIG. 12 corresponds a case where the band allocation depicted in FIG. 9 is performed. FIG. 12 illustrates operations that are performed by the base station eNB1 to determine the band allocation for a mobile station involved in cooperative communication. Steps S10 to S12 are the same as steps S0 to S2, which are depicted in FIG. 11. After completion of steps S10 to S12, the base station eNB1 determines the band allocations for all mobile stations in such a manner that they are orthogonal to each other in the frequency domain (step S13). In the modified example of FIG. 12, the channel performance estimated by the other base station eNB2 is not demanded as indicated in the flowchart of FIG. 11. Hence, the band allocations are determined solely from the channel performance estimated by the base station eNB1. The other base station eNB2 is then notified of the band allocation for a mobile station involved in cooperative communication (step S14).

However, the band allocation for a mobile station involved in cooperative communication and the band allocation for a mobile station uninvolved in cooperative communication are allowed to overlap with each other in the other base station eNB2. Therefore, the other base station eNB2 can determine the band allocations without considering the band allocation for a mobile station involved in cooperative communication. Consequently, the other base station eNB2 can determine the band allocation for a mobile station uninvolved in cooperative communication even before it is notified of the band allocation for a mobile station involved in cooperative communication.

Step S15 is the same as step S7, which is depicted in FIG. 11. In the above-described example, the band allocation for a mobile station involved in cooperative communication is determined without using the channel performance estimated by the other base station. Alternatively, however, the determination may be made by using the channel performance estimated by the other base station.

Figure 13:
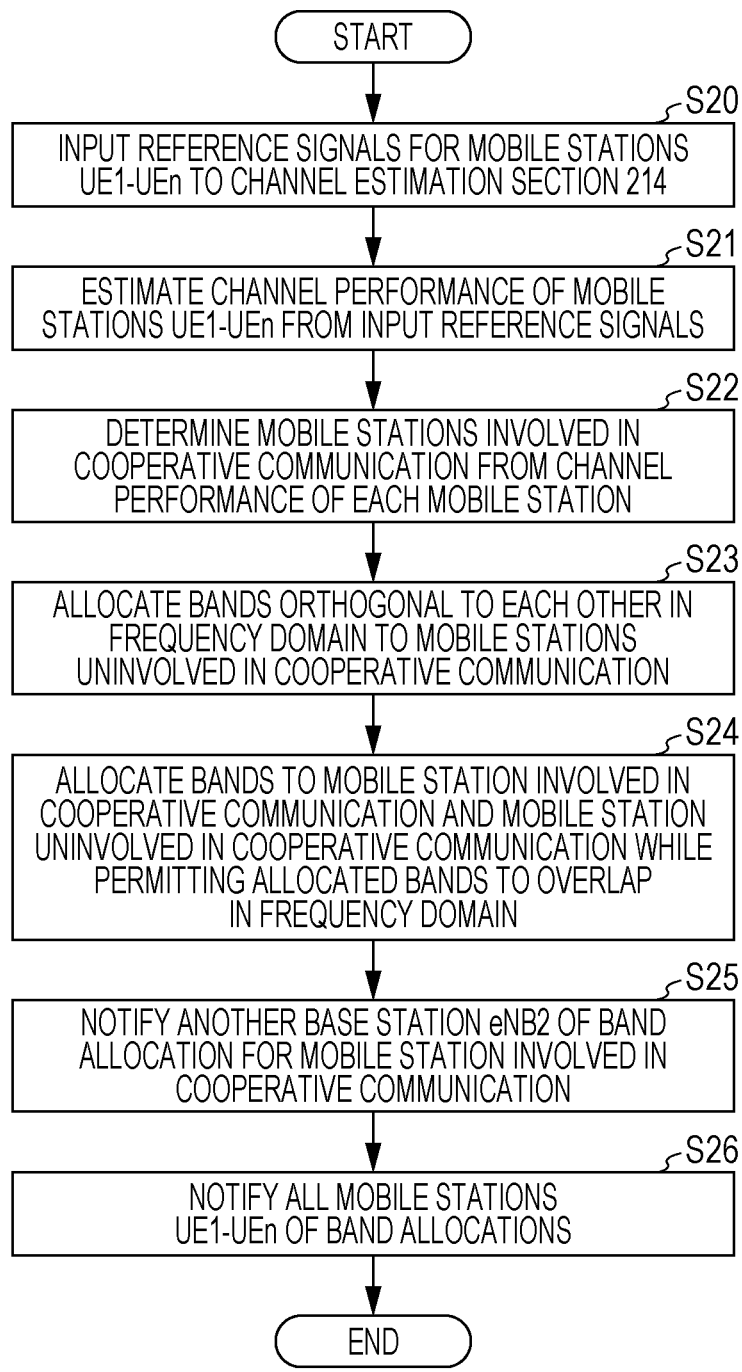
FIG. 13 is a flowchart illustrating a modified example of the operations depicted in FIG. 11 that are performed in a base station eNB1 according to the first embodiment of the present invention in order to determine the band allocation.

FIG. 13 is a flowchart illustrating a modified example of the operations depicted in FIG. 11 that are performed in the base station eNB1 according to the first embodiment of the present invention in order to determine the band allocation. In the example of FIG. 13, the band allocations depicted in FIG. 10 are determined. Steps S20 to S22 are the same as steps S0 to S2, which are depicted in FIG. 11. For mobile stations uninvolved in cooperative communication, the band allocations are determined in accordance with the estimated channel performance so that the band allocations are orthogonal to each other in the frequency domain (step S23). Next, the band allocation for a mobile station uninvolved in cooperative communication is determined while permitting the band allocation for a mobile station involved in cooperative communication to overlap in the frequency domain with the band allocation for the mobile station uninvolved in cooperative communication (step S24). Steps S25 and S26 are the same as steps S6 and S7, which are depicted in FIG. 11.

Figure 14:
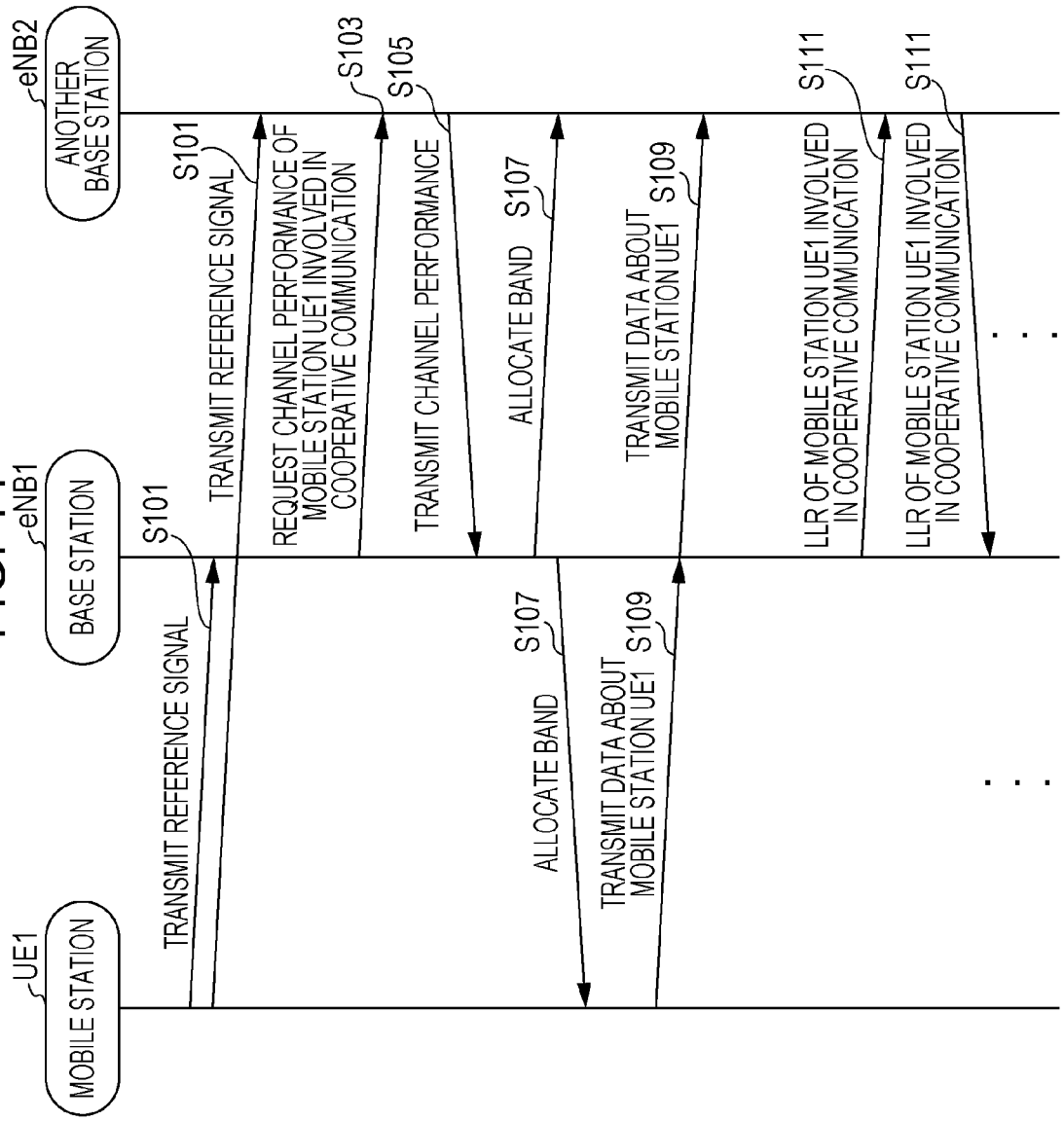
FIG. 14 is a sequence diagram illustrating operations that are performed in accordance with the first embodiment of the present invention by a mobile station, a base station, and another base station, which operate in accordance with the flowchart of FIG. 11.

FIG. 14 is a sequence diagram illustrating operations that are performed in accordance with the first embodiment of the present invention by the mobile station UE1, the base station eNB1, and the other base station eNB2, which operate in accordance with the flowchart of FIG. 11. The mobile station UE1 transmits the reference signal to the base station eNB1 (step S101). The reference signal may be transmitted to the other base station eNB2, which cooperatively communicates with the base station eNB1, at the same timing as the transmission of the reference signal to the base station eNB1 or at a different timing. The base station eNB1 estimates the channel performance of the mobile station from the reference signal and notifies the other base station eNB2 of the result of estimation. Further, the base station eNB1 not only transmits information about the mobile station involved in the cooperative communication to the other base station eNB2, but also issues a notification to demand the channel performance of the mobile station involved in the cooperative communication, which is estimated by the other base station eNB2 (step S103). Next, the base station eNB1 receives the channel performance of the mobile station involved in the cooperative communication, which is estimated by the other base station eNB2 (step S105). In accordance with the locally estimated channel performance and the channel performance estimated by the other base station eNB2, the base station eNB1 determines the band allocation for the mobile station UE1 involved in cooperative communication. The other base station eNB2 and the mobile station UE1 involved in cooperative communication are then notified of the determined band allocation (step S107). The mobile station UE1 transmits data in accordance with the notified band allocation (step S109). The transmitted data is received by the base station eNB1 and the other base station eNB2. This reception process is completed by sharing the LLR and performing a combining process (step S111).

The present embodiment has been described on the assumption that each base station has one receive antenna and that two mobile stations simultaneously use at least certain frequencies. However, the present invention is not limited to such a case. The present invention is also applicable to a case where the number of receive antennas of each base station is $T_{RX}(>1)$ and a case where the number of mobile stations that simultaneously use at least certain frequencies is $T_{RX}+1$ or more. If, for instance, $T_{RX}=2$ and three or more mobile stations are involved in cooperative communication, the band allocations for the mobile stations involved in cooperative communication are determined independently of the band allocations for the other mobile stations. As a result, the mobile stations involved in cooperative communication and the mobile stations uninvolved in cooperative communication use the same frequencies. It means that three or more mobile stations use some identical frequencies.

When the present embodiment is applied to establish cooperative communication as described above, all base stations do not need to maintain the orthogonality of mobile station band allocations. This enables a cooperatively communicating wireless communication system to use frequencies efficiently, thereby increasing the efficiency of frequency use. Further, the inter-user interference caused by overlapping band allocations is canceled by the reception process. This makes it possible to reduce the influence on transmission performance and provide an increased throughput.

[Second Embodiment]

An example, in which a transmission power parameter is determined by cooperatively communicating base stations when the band allocation for a mobile station involved in cooperative communication and the band allocation for a mobile station uninvolved in cooperative communication overlap with each other in the frequency domain, is described below.

Figure 15:
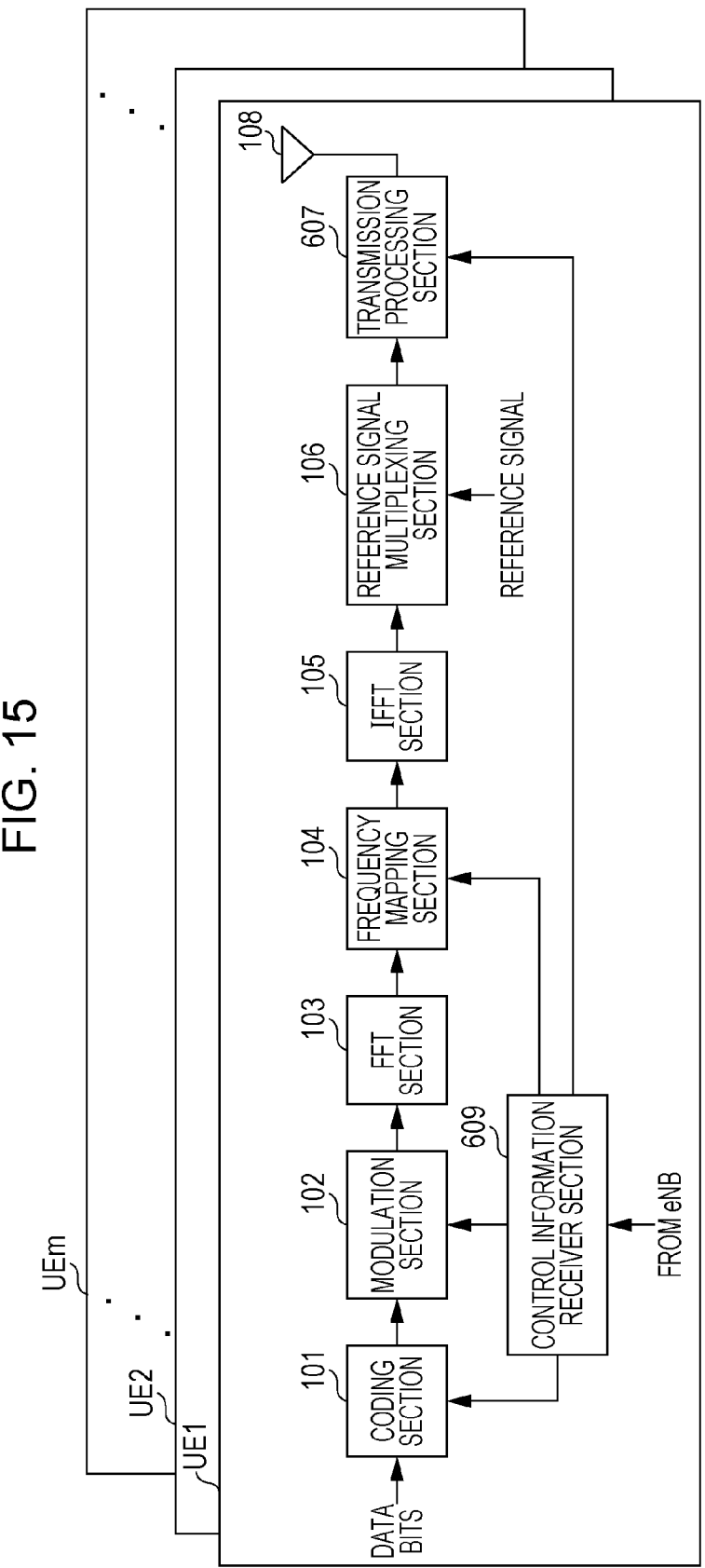
FIG. 15 is a block diagram illustrating an exemplary configuration of mobile stations according to a second embodiment of the present invention.

FIG. 15 is a block diagram illustrating an exemplary configuration of the mobile stations UE1-UEm according to a second embodiment of the present invention. In the second embodiment, the band allocation is performed as depicted in FIG. 9 or 10, as is the case with the foregoing embodiment. Although the mobile stations UE1-UEm have basically the same configuration as those used in the foregoing embodiment, the second embodiment differs from the foregoing embodiment in that the second embodiment has a control information receiver section 609 and a transmission processing section 607, which differ from their counterparts used in the foregoing embodiment, as depicted in FIG. 15. As the transmission process performed by each mobile station is the same as described in conjunction with the foregoing embodiment, only the differences from the foregoing embodiment will now be described with reference to FIG. 15.

The control information receiver section 609 receives control information, which includes a parameter concerning transmission power in addition to the frequency allocation information for data transmission, the modulation order, the coding rate, and the coding method. The parameter concerning transmission power is input to the transmission processing section 607 and used when the transmission power is amplified by a power amplifier (PA).

In a case where a dynamic scheduling scheme is applied, the transmission power $P_{PUSCH}(i)$ used for data transmission by each mobile station is determined by the following equation:

[Math. 1]

$$P_{PUSCH}(i)=\min\{P_{CMAX},10\log_{10}(M_{PUSCH}(i))+P_{o\_PUSCH}+\alpha\times PL+\Delta_{TF}(i)+f(i)\} \quad (1)$$

In the above equation, min is a function that selects a small value within { }. $P_{CMAX}$ is the maximum permissible transmission power of each mobile station. $M_{PUSCH}(i)$ is the number of RBs allocated to the i-th subframe. $P_{o\_PUSCH}$ is nominal target reception power per RB. $\alpha$ is a cell-specific parameter. PL is a path loss. $\Delta_{TF}(i)$ is a parameter based on the modulation order and coding rate. f(i) is a parameter that is transmitted from a base station to a mobile station for closed-loop control purposes. i is the number of a subframe.

Figure 16:
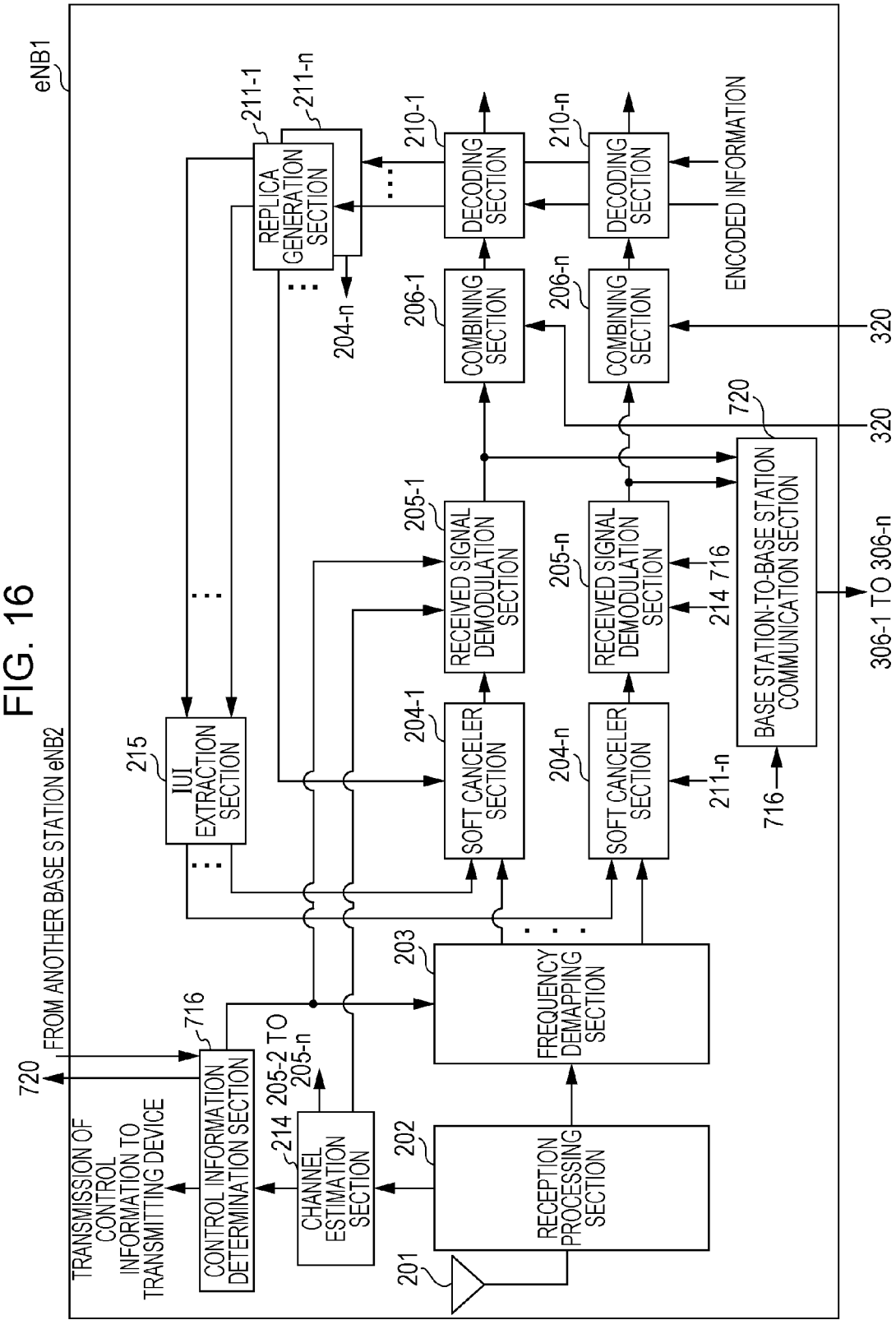
FIG. 16 is a block diagram illustrating an exemplary configuration of a base station according to the second embodiment of the present invention.

FIG. 16 is a block diagram illustrating an exemplary configuration of the base station eNB1 according to the second embodiment of the present invention that receives data transmitted from a plurality of mobile stations. Only the difference between the base station eNB1 according to the present embodiment and the base station eNB1 according to the foregoing embodiment will be described. The channel estimation section 214 calculates the channel performance of each mobile station from the separated reference signal. A control information determination section 716 determines a parameter $P_{o\_eNB1}$, which corresponds to $P_{o\_PUSCH}$ in Equation (1), in such a manner that each mobile station provides the nominal target reception power per RB.

The parameter concerning the transmission power of a mobile station uninvolved in cooperative communication is transmitted as is to a mobile station, as the control information, together with the other control information such as the modulation method, coding rate, band allocation, and the like. However, the parameter concerning the transmission power may be transmitted at a timing different from the timing at which the other control information is transmitted. Meanwhile, the parameter concerning the transmission power of a mobile station involved in cooperative communication is transmitted to the other base station eNB2 through a base station-to-base station communication section 720. Therefore, a transmission power parameter $P_{o\_eNB2}$ calculated by a control information determination section 316 of the other base station eNB2 is input to the control information determination section 716.

The method of determining $P_{o\_PUSCH}$ in the present embodiment will now be described. The base station eNB1 needs to set $P_{o\_PUSCH}$ in such a manner that a mobile station achieves predetermined quality. Therefore, the following equation is used to determine $P_{o\_PUSCH}$ so that all base stations eNB1, eNB2 providing cooperative communication achieve nominal target reception power quality per RB:

[Math. 2]

$$P_{o\_PUSCH}=\max\{P_{o\_eNB1},P_{o\_eNB2}\} \quad (2)$$

where max is a function that selects a great value within { }.

However, when Equation (2) is used to determine the transmission power parameter, the transmission power becomes higher than required. Hence, in some situations, an uncooperatively communicating base station may be significantly interfered with. As such being the case, the value of the average of $P_{o\_eNB1}$ and $P_{o\_eNB2}$ may be used as a modified embodiment. Further, as another modified embodiment, the values of a plurality of base stations may be weighted to use the resulting value as the average value. In this case, for example, the following equation may be used:

[Math. 3]

$$\alpha\times P_{o\_eNB1}+\beta\times P_{o\_eNB2} \quad (3)$$

where $\alpha+\beta=1$.

As described above, when the present embodiment is applied to a case where the band allocation for a mobile station involved in cooperative communication and the band allocation for a mobile station uninvolved in cooperative communication overlap with each other in the frequency domain, each base station can achieve predetermined reception quality. This makes it possible to provide an increased throughput.

[Third Embodiment]

An example, in which a unique method is employed to determine a precoding scheme that a mobile station involved in cooperative communication uses for multi-antenna transmission purposes when the frequency-domain band allocation for the mobile station involved in cooperative communication overlaps with the frequency-domain band allocation for a mobile station uninvolved in cooperative communication, is described below.

Figure 17:
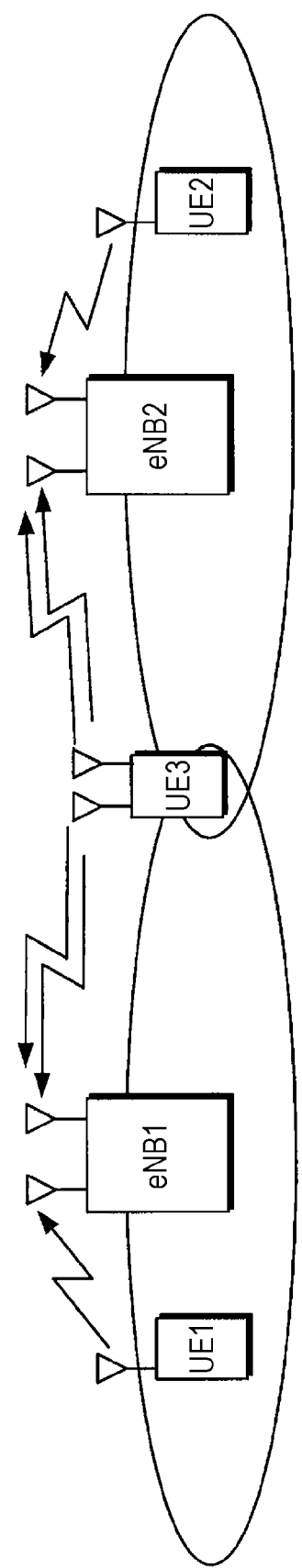
FIG. 17 is a schematic diagram illustrating a communication system according to a third embodiment of the present invention.

FIG. 17 is a schematic diagram illustrating a communication system according to a third embodiment of the present invention in which cooperative communication is applied to data transmission by a mobile station having a plurality of antennas. In the example of FIG. 17, the mobile station UE3 has two transmit antennas and perform data transmission by using a plurality of antennas. The base stations eNB1, eNB2 share respectively received data through optical fiber or the like and detect a signal by combining the data. The frequency-domain band allocations in a situation where cooperative communication is established are nonorthogonal to each other, as is the case the foregoing embodiment.

Figure 18:
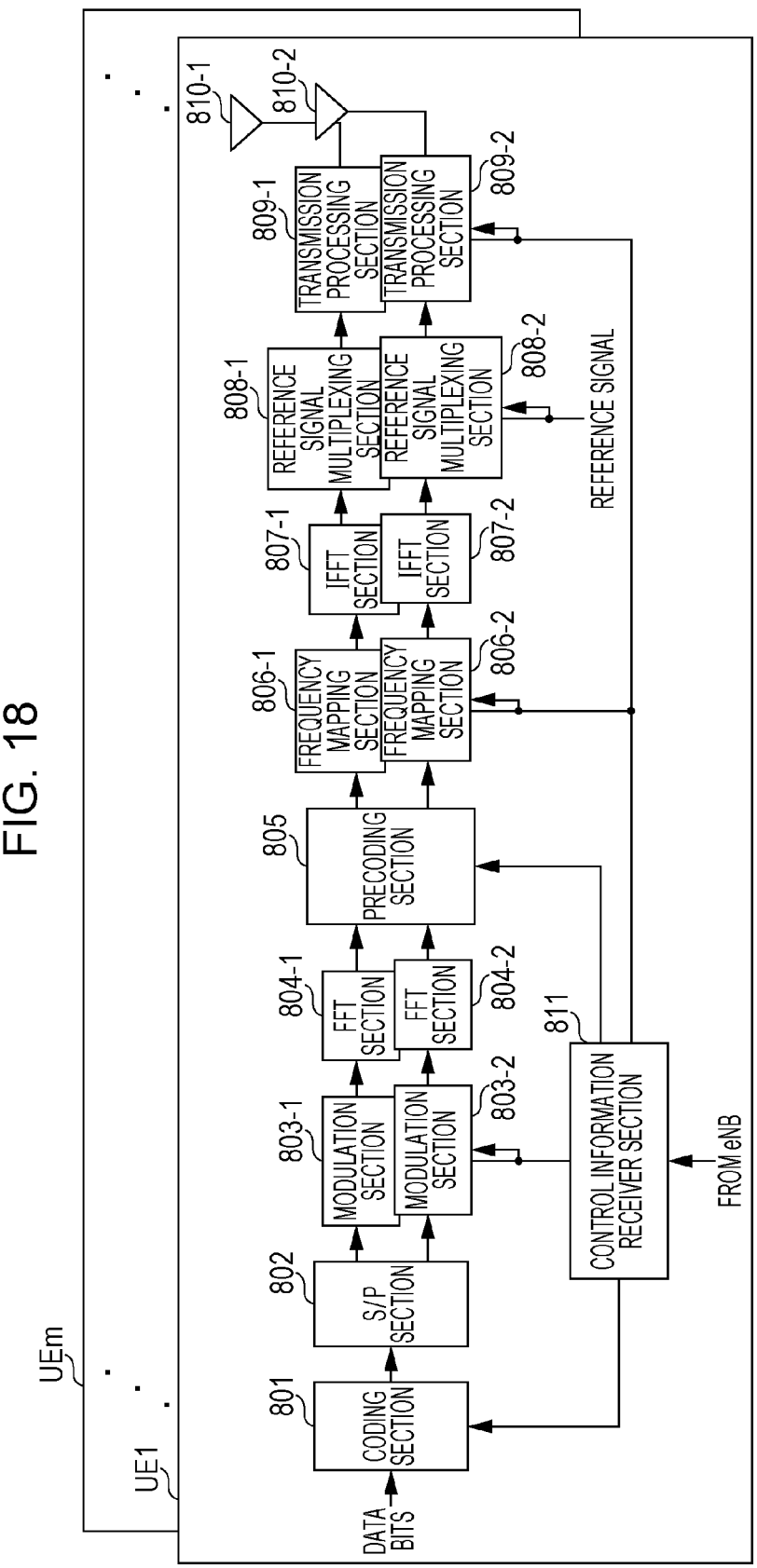
FIG. 18 is a block diagram illustrating an exemplary configuration of mobile stations according to the third embodiment of the present invention.

FIG. 18 is a block diagram illustrating an exemplary configuration of the mobile stations UE1-UEm according to the third embodiment of the present invention. Although the number of transmit antennas is two in the exemplary configuration depicted in FIG. 18, it may alternatively be three or more. In the mobile stations UE1-UEm, a coding section 801 encodes transmission data bits and inputs the resulting encoded bits to an S/P section 802. The S/P section 802 rearranges the encoded bits in the form of transmission bit strings for the transmit antennas, and inputs the respective transmission bit strings to modulation sections 803-1, 803-2.

The modulation sections 803-1, 803-2 modulate a plurality of encoded bit strings. FFT sections 804-1, 804-2, which are respectively associated with the modulation sections 803-1, 803-2, convert the modulated encoded bit strings to frequency-domain signals and input the frequency-domain signals to a precoding section 805. The precoding section 805 multiplies the inputs from the FFT sections 804-1, 804-2 by a precoding matrix (PM) transmitted from a base station.

A candidate PM to be applied to a mobile station is predetermined between the transmitting and receiving devices and converted to an index. Therefore, the base station transmits the index to the mobile station by using control information called precoding matrix indicator (PMI). Processes performed in frequency mapping sections 806-1, 806-2, IFFT sections 807-1, 807-2, reference signal multiplexing sections 808-1, 808-2, and transmission processing sections 809-1, 809-2 are the same as those described in conjunction with the foregoing embodiment and will not be redundantly described. Antennas 810-1, 810-2 transmit signals at the same time and at the same frequency.

Figure 19:
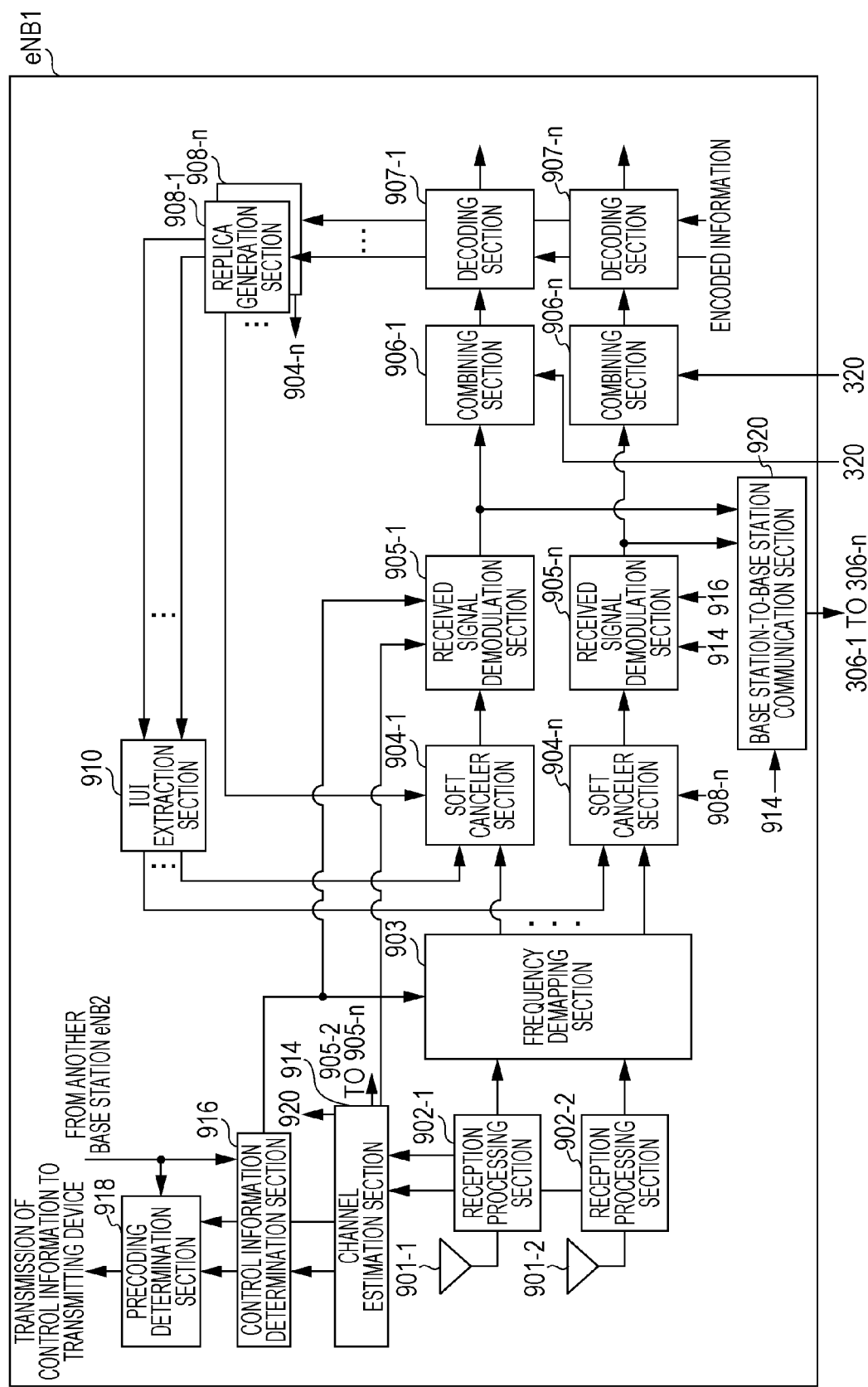
FIG. 19 is a block diagram illustrating an exemplary configuration of a base station according to the third embodiment of the present invention.

FIG. 19 is a block diagram illustrating an exemplary configuration of the base station eNB1 according to the third embodiment of the present invention. In the exemplary configuration depicted in FIG. 19, two receive antennas are used. Alternatively, however, three or more receive antennas may be used. The base station eNB1 receives a signal with antennas 901-1, 901-2 and inputs the received signal to reception processing sections 902-1, 902-2. Processes performed by the reception processing sections 902-1, 902-2 are the same as those described in conjunction with the foregoing embodiment. A separated reference signal is input to a channel estimation section 914, whereas a data signal is input to a frequency demapping section 903.

The channel estimation section 914 estimates the channel performance (frequency response) between the transmit and receive antennas and inputs the estimated channel performance to a control information determination section 916. From the channel performance, the control information determination section 916 determines the band allocation for each mobile station, coding rate, modulation method, and other control information required for data transmission. The determined control information and the channel performance input to the control information determination section 916 are also input to a precoding determination section 918. The precoding determination section 918 determines a precoding scheme from the input channel performance by using a later-described method, and transmits the determined precoding scheme to each mobile station at the same timing as the transmission of the other control information or at a different timing. The employed channel performance is estimated by the channel estimation section 914 and the channel estimation section of the other base station.

The frequency demapping section 903 separates the signals received by the antennas in accordance with user-specific band allocation information and inputs the resulting signals to soft canceler sections 904-1 to 904-$n$. The soft canceler sections 904-1 to 904-$n$ process the same process on the signals received by the antennas as described in conjunction with the foregoing embodiment and input the resulting outputs to received signal demodulation sections 905-1 to 905-$n$, respectively.

Figure 20:
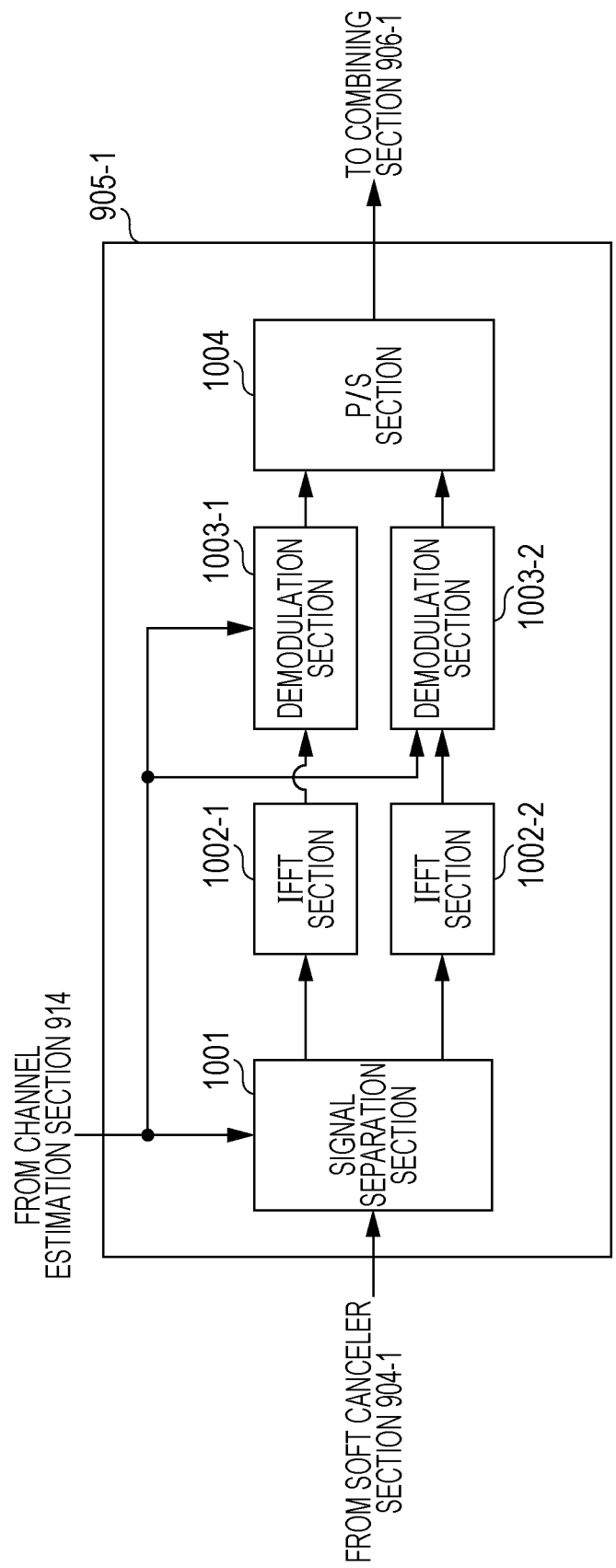
FIG. 20 is a block diagram illustrating the configuration of a received signal demodulation section according to the third embodiment of the present invention.
Figure 21:
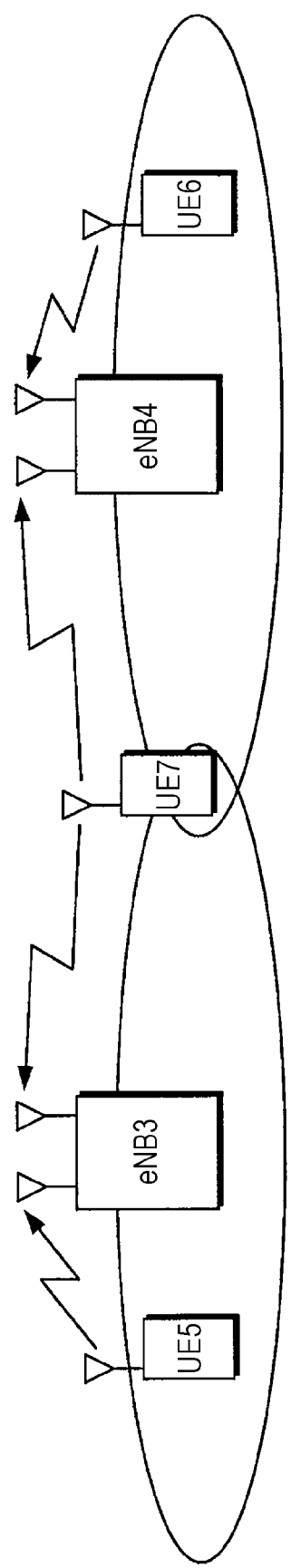
FIG. 21 is a schematic diagram illustrating a conventional system.

FIG. 20 is a block diagram illustrating the configuration of the received signal demodulation sections 905-1 to 905-$n$ according to the third embodiment of the present invention. As the received signal demodulation sections 905-1 to 905-$n$ have the same configuration, the received signal demodulation sections 905-1 will now be described with reference to FIG. 20. Signals received by a plurality of antennas are input from the soft canceler section 904-1 to a signal separation section 1001. The signal separation section 1001 performs spatial filtering by multiplying the signal spatially multiplexed with respect to each receive antenna by an MMSE weight and separates the resulting signal into a signal for each transmit antenna.

IFFT sections 1002-1, 1002-2 respectively convert the separated signals to time-domain signals. Demodulation sections 1003-1, 1003-2 calculate the LLRs of encoded bits by using the input time-domain signals. A P/S section 1004 rearranges the LLRs output from the demodulation sections 1003-1, 1003-2 in an encoded bit sequence obtained by the coding section 801.

The LLRs output from the P/S section 1004 are input to a combining section 906-1. The combining sections 906-1 to 906-$n$ and decoding sections 907-1 to 907-$n$ perform the same process as described in conjunction with the foregoing embodiment and input decoded bits to replica generation sections 908-1 to 908-$n$. The replica generation sections 908-1 to 908-$n$ perform the same process on the input encoded bits as the process performed by the S/P section 802 in a mobile station. Subsequent processes are the same as those described in conjunction with the foregoing embodiment.

The process performed by the precoding determination section 918 of a base station will now be described. The channel performance obtained by each base station is input to the precoding determination section 918 of a base station. The channel performance of the k-th frequency of the i-th base station is expressed by the following equation:

[Math. 4]

$$H_i(k) = \begin{pmatrix} h_{0,0}(k) & h_{0,1}(k) & \cdots & h_{Nt-1,0}(k) \\ h_{1,0}(k) & h_{1,1}(k) & \cdots & h_{Nt-1,1}(k) \\ \vdots & \vdots & \ddots & \vdots \\ h_{Nr-1,0}(k) & h_{Nr-1,1}(k) & \cdots & h_{Nr-1,Nt-1}(k) \end{pmatrix} \quad (4)$$

where Nt is the number of transmit antennas and Nr is the number of receive antennas.

The frequency response obtained at all base stations is as follows:

[Math. 5]

$$H = \begin{pmatrix} H_0 \\ H_1 \\ \vdots \\ H_{L-1} \end{pmatrix} \quad (5)$$

where L is the number of cooperatively communicating base stations.

If PM used for multiplication at a mobile station is P, an equivalent channel H' is expressed by the following equation:
[Math. 6]

$$H' = HP \quad (6)$$

Thus, an equalized signal $R_{eq}$ is expressed by the following equation:
[Math. 7]

$$R_{eq} = w_{MMSE} H' S + n \quad (7)$$

where $w_{MMSE}$ is the MMSE weight, S is a transmitted signal, and n is noise. Thus, an equivalent amplitude gain μ is obtained by the following equation:
[Math. 8]

$$\mu = w_{MMSE} HP \quad (8)$$

However, P is a precoding matrix and a matrix of $N_t$ rows and $N_{RANK}$ columns, and $N_{RANK}$ is the number of transmitted signals (also referred to as the number of ranks, the number of layers, or the number of streams). Therefore, when two transmit antennas are used to transmit the same signals, P is a matrix of two rows and one column. When, on the other hand, two transmit antennas are used to transmit different signals, P is a square matrix of two rows and two columns.

The obtained equivalent amplitude gain μ is a matrix of $N_{RANK}$ rows and $N_{RANK}$ columns. A vector μ' obtained by extracting a diagonal component is expressed by the following equation:
[Math. 9]

$$\mu' = [\mu(0), \mu(1), \ldots, \mu(N_{RANK}-1)] \quad (9)$$

where μ(i) is the equivalent amplitude gain of the i-th stream.

When the antennas of a mobile station transmit the same signals, the precoding matrix P should be determined so that the number of ranks is 1 and that the equivalent amplitude gain μ(0) is maximized.

When, on the other hand, the antennas transmit different signals, the SINR of each antenna needs to be calculated, and SINRγ(i) of the i-th stream is given by the following equation:

[Math. 10]

$$\gamma(i) = \frac{\mu(i)}{1 - \mu(i)} \quad (10)$$

The precoding matrix P is then determined so that, for example, the following equation is maximized:

[Math. 11]

$$\sum_{i=0}^{N_{RANK}-1} \gamma(i) \quad (11)$$

Alternatively, the precoding matrix P may be determined so as to maximize Equation (12), which expresses the capacity:

[Math. 12]

$$\sum_{i=0}^{N_{RANK}-1} \log_2(\gamma(i) + 1) \quad (12)$$

As described above, when the present embodiment is applied to a case where the band allocation for a mobile station involved in cooperative communication and the band allocation for a mobile station uninvolved in cooperative communication overlap with each other in the frequency domain, each base station can achieve predetermined reception quality. This makes it possible to provide an increased throughput.

A program running in the mobile station device and base station device according to the present invention is a program for controlling, for instance, a CPU (a program that causes a computer to function) in such a manner as to implement the functions of the foregoing embodiments. Information handled by these devices is temporarily stored in a RAM when processed. The information is subsequently stored in various types of ROM or on an HDD, and read, modified, or updated as needed by the CPU. A recording medium for storing the program may be a semiconductor medium (for example, a ROM or a nonvolatile memory card), an optical recording medium (for example, a DVD, an MO, an MD, a CD, or a BD), a magnetic recording medium (for example, a magnetic tape or a flexible disk), or the like.

When the program is loaded and executed, the functions of the foregoing embodiments are implemented. In some cases, the functions of the present invention may be implemented when processing is performed in accordance with instructions issued by the program and in coordination with an operating system or another application program or the like. When the program is to be distributed to the market, the program may be stored in a portable recording medium for distribution purposes or transferred to a server computer through a network such as the Internet. In such an instance, a storage device of the server computer is included in the present invention.

Further, a part or the whole of the mobile station device and base station device according to the foregoing embodiments may be typically implemented as an LSI, which is an integrated circuit. Functional blocks of the mobile station device and base station device may be individually implemented as a chip. Alternatively, a part or the whole of the functional blocks may be integrated and implemented as a chip. Furthermore, circuit integration may be achieved by using a dedicated circuit or a general-purpose processor instead of an LSI. Moreover, when a circuit integration technology is developed due to an advanced semiconductor technology so as to newly create an integrated circuit that supersedes an LSI circuit, such a newly created integrated circuit may be used.

While the embodiments of the present invention have been described in detail by referring to the drawings, the details of the configuration according to the present invention are not limited to those described in conjunction with the embodiments. Design changes and other modifications falling within the spirit of the present invention are also included within the scope of the appended claims.

REFERENCE SIGNS LIST

UE1-UEm mobile station
101 coding section
102 modulation section
103 FFT section
104 frequency mapping section
105 IFFT section
106 reference signal multiplexing section
107 transmission processing section
108 transmit antenna
109 control information receiver section
eNB1-eNB4 base station
201 antenna
202 receiver section
203 frequency demapping section
204-1 to 204-$n$ soft canceler section
205-1 to 205-$n$ received signal demodulation section
206-1 to 206-$n$ combining section
210-1 to 210-$n$ decoding section
211-1 to 211-$n$ replica generation section
214 channel estimation section
216 control information determination section
218 IUI extraction section
220 base station-to-base station communication section
301 antenna
302 receiver section
303 frequency demapping section
304-1 to 304-$n$ soft canceler section
305-1 to 305-$n$ received signal demodulation section
306-1 to 306-$n$ combining section
310-1 to 310-$n$ decoding section
311-1 to 311-$n$ replica generation section
314 channel estimation section
316 control information determination section
318 IUI extraction section
320 base station-to-base station communication section
401 reception processing section
402 reference signal separation section
403 FFT section
501 equalizer section
502 IFFT section
503 demodulation section
607 transmission processing section
609 control information receiver section
716 control information determination section
720 base station-to-base station communication section
801 coding section
802 S/P section
803-1, 803-2 modulation section
804-1, 804-2 FFT section
805 precoding section
806-1, 806-2 frequency mapping section
807-1, 807-2 IFFT section
808-1, 808-2 reference signal multiplexing section
809-1, 809-2 transmission processing section
810-1, 810-2 antenna
901-1, 901-2 antenna
902-1, 902-2 reception processing section
903 frequency demapping section
904-1 to 904-$n$ soft canceler section
905-1 to 905-$n$ received signal demodulation section
906-1 to 906-$n$ combining section
907-1 to 907-$n$ decoding section
908-1 to 908-$n$ replica generation section
910 IUI extraction section
914 channel estimation section
916 control information determination section
918 precoding determination section
1001 signal separation section
1002-1, 1002-2 IFFT section
1003-1, 1003-2 demodulation section
1004 P/S section

The invention claimed is:

1. A base station device applied to a communication system in which a plurality of base station devices establish cooperative communication with at least one mobile station device, the base station device comprising:
a base station-to-base station communication circuit that communicates with another base station device in a case of establishing cooperative communication; and
a control information determination circuit that allocates a band for communication use by the mobile station device in such a manner that a signal received cooperatively by the another base station device and a signal received uncooperatively by yet another base station device overlap with each other at certain frequencies;
wherein signals are received h a smaller number of antennas than a total number of signals allocated to the certain frequencies in an overlapping manner.

2. The base station device according to claim 1, wherein a signal of the mobile station device, which is received cooperatively by the other base station device, is shared with the another base station device to perform a cancellation process.

3. The base station device according to claim 1, wherein a signal allocated to the certain frequencies in an overlapping manner is shared with another base station device to perform a cancellation process.

4. The base station device according to claim 1, wherein, in a case that a band for communication use by the mobile station device is to be allocated in such a manner that a signal received cooperatively and a signal received uncooperatively overlap with each other at certain frequencies in another base station device, the control information determination circuit allocates the band for communication use by the mobile station device so that the signal received cooperatively and the signal received uncooperatively are orthogonal to each other in a frequency domain.

5. The base station device according to claim 1, wherein, in a case that a band for communication use by the mobile station device is to be allocated in such a manner that a signal received cooperatively and a signal received uncooperatively overlap with each other at certain frequencies in another base station device, the control information determination circuit allocates the band for communication use by the mobile station device so that the signal received cooperatively and the signal received uncooperatively overlap with each other at the certain frequencies.

6. The base station device according to claim 1, wherein the base station device calculates a transmission power parameter that achieves predetermined reception quality in the mobile station device, shares the calculated transmission power parameter with another base station device, and notifies the mobile station device of a maximum value of the transmission power parameter calculated by each base station device.

7. The base station device according to claim 1, wherein the base station device calculates a transmission power parameter that achieves predetermined reception quality in the mobile station device, shares the calculated transmission power parameter with another base station device, and notifies the mobile station device of an average value of the calculated transmission power parameter calculated by each base station device.

8. The base station device according to claim 1, wherein the base station device not only calculates, in accordance with a channel estimation signal received from a mobile station device having a plurality of antennas, a frequency response of each of the plurality of antennas, but also shares the calculated frequency response with another base station device and determines a precoding scheme in accordance with the calculated frequency response so as to maximize a signal-to-interference-plus-noise ratio (SINR).

9. The base station device according to claim 1, wherein the base station device not only calculates, in accordance with a channel estimation signal received from a mobile station device having a plurality of antennas, a frequency response of each of the plurality of antennas, but also shares the calculated frequency response with another base station device and determines a precoding scheme in accordance with the calculated frequency response so as to provide a maximum capacity.

10. A mobile station device that establishes cooperative communication with a plurality of base station devices by using a frequency band allocated by the base station device according to claim 1.

* * * * *